US007844814B2

(12) United States Patent
Baum

(10) Patent No.: US 7,844,814 B2
(45) Date of Patent: *Nov. 30, 2010

(54) METHODS AND APPARATUS FOR PROTECTING AGAINST IP ADDRESS ASSIGNMENTS BASED ON A FALSE MAC ADDRESS

(75) Inventor: Robert T Baum, Gaithersburg, MD (US)

(73) Assignee: Verizon Services Corp., Ashburn, VA (US)

( * ) Notice: Subject to any disclaimer, the term of this patent is extended or adjusted under 35 U.S.C. 154(b) by 311 days.

This patent is subject to a terminal disclaimer.

(21) Appl. No.: 11/953,753

(22) Filed: Dec. 10, 2007

(65) Prior Publication Data

US 2008/0092228 A1 Apr. 17, 2008

Related U.S. Application Data

(63) Continuation of application No. 10/616,405, filed on Jul. 8, 2003, now Pat. No. 7,320,070, which is a continuation-in-part of application No. 10/457,111, filed on Jun. 9, 2003, and a continuation-in-part of application No. 10/457,107, filed on Jun. 9, 2003, and a continuation-in-part of application No. 10/337,106, filed on Jan. 6, 2003.

(60) Provisional application No. 60/455,353, filed on Mar. 17, 2003, provisional application No. 60/346,596, filed on Jan. 8, 2002.

(51) Int. Cl.
*H04L 9/00* (2006.01)
*H04L 29/08* (2006.01)

(52) U.S. Cl. ........................................ 713/153; 726/14

(58) Field of Classification Search .................. 726/13; 713/154

See application file for complete search history.

(56) References Cited

U.S. PATENT DOCUMENTS

| | | | | |
|---|---|---|---|---|
| 6,012,088 | A | 1/2000 | Li et al. | |
| 6,069,890 | A | 5/2000 | White et al. | |
| 6,134,315 | A | 10/2000 | Galvin | |
| 6,298,130 | B1 | 10/2001 | Galvin | |
| 6,307,920 | B1 | 10/2001 | Thomson et al. | |
| 6,335,927 | B1 | 1/2002 | Elliott et al. | |
| 6,345,095 | B1 | 2/2002 | Yamartino | |
| 6,393,484 | B1 * | 5/2002 | Massarani | 709/227 |
| 6,678,265 | B1 | 1/2004 | Kung et al. | |
| 6,680,998 | B1 | 1/2004 | Bell et al. | |
| 6,684,250 | B2 | 1/2004 | Anderson et al. | |
| 6,738,808 | B1 | 5/2004 | Zellner et al. | |
| 6,839,323 | B1 | 1/2005 | Foti | |
| 6,856,676 | B1 | 2/2005 | Pirot et al. | |

(Continued)

*Primary Examiner*—Matthew B Smithers

(57) ABSTRACT

Methods and apparatus detecting attempts to obtain IP addresses by faking a MAC address in a data portion of an IP address request message are described. In accordance with the present invention, rather than use standard address allocation protocols, e.g., ARP, the DNS DCHP contacts the requesting edge router via a private secure network. The MAC address received in the address request is compared to the MAC addresses stored in the edge routers port/MAC address resolution table. If the MAC address received in the request message cannot be found in the edge router's table which was created from the MAC address included in the message's header, a fraudulent attempt to obtain a MAC address is declared. The fraudulent attempt to obtain an IP address can be reported and steps taken to identify the perpetrator of the fraud.

9 Claims, 18 Drawing Sheets

U.S. PATENT DOCUMENTS

| | | | |
|---|---|---|---|
| 6,925,076 | B1 | 8/2005 | Dalgic et al. |
| 6,940,866 | B1 | 9/2005 | Miller et al. |
| 6,975,587 | B1 | 12/2005 | Adamski et al. |
| 7,007,080 | B2 | 2/2006 | Wilson |
| 7,039,721 | B1 | 5/2006 | Wu et al. |
| 7,072,346 | B2 * | 7/2006 | Hama .................... 370/395.53 |
| 7,184,418 | B1 | 2/2007 | Baba et al. |
| 7,197,549 | B1 | 3/2007 | Salama et al. |
| 7,320,070 | B2 * | 1/2008 | Baum ......................... 713/153 |
| 2001/0040885 | A1 | 11/2001 | Jonas et al. |
| 2002/0021675 | A1 | 2/2002 | Feldman |
| 2002/0054667 | A1 | 5/2002 | Martinez |
| 2002/0057764 | A1 | 5/2002 | Salvucci |
| 2002/0136361 | A1 | 9/2002 | Stumer |
| 2002/0165835 | A1 | 11/2002 | Igval |
| 2003/0063714 | A1 | 4/2003 | Stumer et al. |
| 2003/0147518 | A1 | 8/2003 | Albal et al. |
| 2003/0161335 | A1 | 8/2003 | Fransdonk |
| 2003/0185361 | A1 | 10/2003 | Edwards |
| 2003/0187986 | A1 | 10/2003 | Sundqvist et al. |
| 2004/0190497 | A1 | 9/2004 | Knox |
| 2004/0202171 | A1 | 10/2004 | Hama |
| 2004/0249975 | A1 | 12/2004 | Tuck et al. |

* cited by examiner

PRIOR ART

1714

SUBSCRIBER SERVICE INFORMATION DATABASE

| | 1802 | 1804 | 1806 | 1808 | 1810 | 1812 | 1814 |
|---|---|---|---|---|---|---|---|
| | NAME | PHYSICAL LOCATION | SERVICE INFO | ROUTER/ PORT | MAC | IP ADDRESS | IP ADDRESS LEASE TIME INFORMATION |
| 1820 | JOHN SMITH | 120 SPRING ST LODI, N.J. | VOD- VOD IP ADDRESS | ER2/PORT 1 | MAC 1 | IP ADDRESS 1 | EXPIRES 15:00 7/14/03 |
| 1822 | JIM JONES | 670 RED LANE FARWAY, NJ | VOD/MOD VOD IP ADDRESS MOD IP ADDRESS | ER1/PORT 6 | MAC 2 | IP ADDRESS 2 | EXPIRES 16:00 7/14/03 |
| | . . . | . . . | . . . | . . . | . . . | . . . | . . . |
| 1823 | BOB EVENS | 60 BLUE LANE FARWAY, NJ | BANKING FROM HOME- BANK IP ADDRESS | ------- | ------- | -------- | ---------- |
| 1824 | JANE ROGERS | 720 HOPE RD RED BANK, NJ | VOD VOD IP ADDRESS | --------- | ------- | ---------- | ------------ |
| 1825 | BILL THEIF | 98 REFORM RD RED BANK, NJ | LOC VER- LOC VER IP ADDRESS; EXPECTED LOCATION/ TIME(S); REPORT INFORMAT- ION; REORTING DEVICE MAC ADDRESS | --------- | ------- | ---------- | ------------ |

FIGURE 18

METHODS AND APPARATUS FOR PROTECTING AGAINST IP ADDRESS ASSIGNMENTS BASED ON A FALSE MAC ADDRESS

RELATED APPLICATIONS

The present application is a continuation of U.S. patent application Ser. No. 10/616,405, filed Jul. 8, 2003, which claims the benefit of U.S. Provisional Patent Application Ser. No. 60/455,353, filed Mar. 17, 2003 titled "Methods and Apparatus For Supporting IP Telephony", and which is: a continuation-in-part of U.S. Utility patent application Ser. No. 10/457,111, filed Jun. 9, 2003 titled "Methods And Apparatus For Providing Emergency Telephone Service to IP-Based Telephone Users"; a continuation-in-part of U.S. Utility patent application Ser. No. 10/457,107, filed on Jun. 9, 2003 titled "Methods And Apparatus For Wiretapping IP-Based Telephone Lines"; and a continuation-in-part of U.S. Utility patent application Ser. No. 10/337,106, filed on Jan. 6, 2003 titled "Methods And Apparatus For Determining The Port And/Or Physical Location Of An IP Device And For Using That Information" which claims the benefit of U.S. Provisional Patent Application Ser. No. 60/346,596, filed Jan. 8, 2002 titled "Methods And Apparatus For Determining The Port And/Or Physical Location Of An IP Device And For Using That Information". Each of the preceding identified applications are hereby expressly incorporated by reference.

FIELD OF THE INVENTION

The present invention is directed to communications systems and, more particularly, to methods and apparatus for providing security, authorization and/or screening services in IP communications systems, e.g. networks.

BACKGROUND OF THE INVENTION

Digital communications networks have continued to grow in importance as people have come to rely on the electronic exchange of information to support both business and personal pursuits. E-mail, the electronic transfer of files, and various other services are made possible by the use of digital communications networks.

The type of digital communications network employed often depends on the size of the network to be implemented, as well as the needs and capabilities of the party or parties implementing the network. Hardware cost and network management complexity are often a factor when choosing the type of network to be implemented.

Networks limited to a small geographical region, e.g., home or single office location, are frequently called local area networks ("LANs"). LANs are often privately-owned networks within a single building or small campus. LANS are widely used to connect personal computers and workstations at a single location, e.g., company office or residence, to one another and to shared resources such as printers and/or local centralized file storage.

One popular type of LAN, an IEEE 802.3 standard based LAN is popularly called Ethernet. Ethernet is a bus based broadcast network with decentralized control. When using Ethernet, data, e.g., messages, information and signals are transmitted in Ethernet using frames. Ethernet devices broadcast and receive frames over the shared bus over which the frames are broadcast. The format of an IEEE 802.3 frame 100 is shown in FIG. 1. Each frame 100 starts with a 7 byte preamble 102 containing a preset bit pattern. The preamble

102 is followed by a start of frame byte 104 which includes the bit pattern 10101011 used to denote the start of the frame. Next come two addresses, a destination address 106 and a source address 108. The high-order bit of the destination address is a 0 for ordinary addresses and 1 for group addresses. Group addresses, in contrast to individual device addresses, allow multiple stations, e.g., devices coupled to the Ethernet, to receive frames including a single group address. When a frame is sent to a group address, all the stations in the group receive it. Sending to a group of stations is called a multicast. The address consisting of all 1 bits is reserved for broadcast. A frame containing all is in the destination field, indicating a broadcast, is delivered to all stations on the network.

Six byte global Media Access Control (MAC) Ethernet device addresses are assigned by a central authority to ensure that no two stations on the same Layer 2 network, e.g., Ethernet LAN, have the same global address. Manufacturers of Ethernet devices, e.g., networking boards, request a block of addresses from the central authority to assure that no two Ethernet boards are assigned the same global MAC address. The boards then send and receive frames based on the 48-bit MAC address programmed into the board by the manufacturer. Because source MAC address information is inserted into Ethernet frames by the Ethernet boards, the source address 108 in an Ethernet frame is usually accurate and is difficult to fake.

Since Ethernet MAC address are unique at least on the same Layer 2 network and potentially globally, any device on a Layer 2 network can address any other device on the network by just using the right 48 bit MAC address assigned to the device being addressed.

MAC addresses are data link layer addresses. The data link layer corresponds to the second layer of the seven layer OSI (Open Systems Interconnection) Reference Model. As a result, Ethernet LANs and other LANS which use data link layer addresses are sometimes called Layer 2 networks.

In addition to the address information 106, 108 the Ethernet frame includes a length of data field 110, data field 112, padding field 114 and a checksum field 116. As will be discussed below, information intended to be transmitted over an IP based network may be included in the data field 112.

While Layer 2 networks are well suited for implementing LANs, e.g., at relatively small sites, it is often desirable to connect devices, e.g., computers located on different LANs. Layer 3 networks, which rely on network protocols, e.g. TCP/IP protocols, are often used for interconnecting Layer 2 networks. Layer 3 packets, e.g., IP packets, are often encapsulated in Layer 2 frames to extend the reach of the Layer 3 network to host devices on the Layer 2 network. This permits Layer 2 signaling and frames to be used for transmissions of data over the Ethernet while preserving Layer 3 addressing information for transmission over the Layer 3 network. The network resulting from interconnecting one or more Layer 2 and Layer 3 networks is often referred to as an internet.

The Internet is a well-known worldwide internet that is used to connect computers and other devices located at universities, governments offices, businesses and individuals together.

FIG. 2 is an extremely simplistic representation of the Internet 200. As illustrated, the Internet 200 includes a plurality, e.g., first and second, Layer 2 networks 201, 203, coupled together by a Layer 3 network 205. While only two Layer 2 networks, e.g., Ethernet LANs, are shown, many thousands of such networks may be part of the Internet. Edge routers, e.g., multi-protocol routers, capable of converting between Layer 2 and Layer 3 formats and addressing schemes, are often used to connect Layer 2 networks to Layer 3 networks. In FIG. 2, first edge router 216, connects the first Layer 2 network 201 to the Layer 3 network 205. Similarly the second edge router 218 connects the second Layer 2 network 203 to the Layer 3 network 205.

In the FIG. 2 example, two host devices 208, 210 are shown coupled to the first Ethernet bus 204, used to implement the Ethernet LAN 201, while third and fourth host devices 212, 214 are shown coupled to the second Ethernet bus 206 used to implement Ethernet LAN 203. While only two hosts are shown on each Ethernet LAN it is to be understood that a large number of hosts may be coupled to any one of the Layer 2 networks, corresponding to Ethernet busses 204, 206, at any given time.

Routers, serve as forwarding devices and, optionally, protocol conversion devices. In the FIG. 2 diagram, edge routers 216 and 218 have the capability of converting between Ethernet frames and IP packets, and vice versa, using one or more tables relating IP addresses to MAC addresses.

Routers 222, 224, 226 and 228 internal to the Layer 3 network form part of what is sometimes called the Internet backbone. Since these routers do not need to handle Ethernet frames, they do not include the protocol conversion functionality present in the edge routers 216, 218. Groups of routers 216, 218, 222, 224, 226, 228 managed by a single administrator is often called an Autonomous System (AS). The Internet includes several AS which are connected to each other. Each AS may include one or more DHCP (Dynamic Host Configuration Protocol) servers which are responsible for assigning IP addresses to host devices connected to the AS. In FIG. 2, a single DHCP server 220 is shown coupled to edge routers 216, 218.

Unlike LANs which use data link layer addresses, the Internet uses Layer 3 (Network layer) addresses, e.g., IP Addresses, for purposes of identifying source and destination devices and determining the appropriate route upon which packets should be transmitted. Source and destination IP addresses are included, along with data, in IP packets used to transmit information across the Internet. Every host and router on the Internet has an IP address which encodes its IP network number and host number. The combination is unique, no two machines have the same IP address.

Exemplary IP addresses are 32 bits long and are used in the Source address and Destination address fields of IP packets. FIG. 3 is a diagram 300 which illustrates the standard 32 bit format for IP addresses. Note that host addresses are divided into different classes (A, B, C) with different numbers of bits allocated to the network number and host portion number in each address class. From a management perspective, system administrators may divide the host number portion of a 32 bit IP address into a subnet portion 402 and a host portion 404 as illustrated in block 400 of FIG. 4. In such embodiments, within the network defined by the network portion of the IP address, a subnet mask is used at the routers within the network to distinguish between the host portion 404 and the rest of the 32 bit IP address and thereby allow for routing within the network based on the subnet portion of the address.

The demand for IP address continues to grow and, with fewer bits than are used for MAC addresses, there are considerably fewer IP addresses available for allocation. Given the demand for IP addresses and the limited supply, IP addresses are leased from a central authority responsible for overseeing their allocation. Internet service providers, may lease a large number, e.g., a block of IP addresses, which the provider then sub-leases to end users, e.g., host devices.

As a result of the lease (actually the sub-lease) process, end users obtain an IP address which is subject to lease restrictions including the right to use the IP address for a limited period of time. IP addresses leased for extended periods of time, e.g., a year or more, are often termed "static" IP addresses. Static IP addresses are used for applications such as Web site hosting where the Internet connection is likely to remain active and in use for extended periods of time. Users normally pay a premium for static IP addresses.

With regard to individual Internet users, IP addresses are more commonly leased to end users on a dynamic basis. Internet service providers frequently use a DHCP server to assign users IP addresses for a limited lease time when they seek to access the Internet, e.g., from a host device coupled to the Internet by way of a Layer 2 network. FIG. 2 illustrates a single DHCP server 220 coupled to the two edge routes 216, 218 to oversee IP address allocation. In practice, the Layer 3 network 202 may include multiple DHCP servers with each server being responsible for allocating IP addresses to users on a different network or subnet. The system administrator responsible for overseeing an AS determines the relationship between DHCP servers, sets of IP addresses allocated by each of the DHCP servers and the edge routes which connect users to the DHCP servers for IP address assignment.

Once an IP address is leased to a host, e.g., user, if the host remains active beyond the lease term, the lease may be extended or a new IP address assigned to the host from the available pool of IP addresses at the end of the first lease term.

When a user intends to stop using the IP address, the user's device, e.g., host device 208, normally signals to the DHCP server that assigned the IP address that the address is being released. This allows the address to be added to the pool of available addresses and reused. In the event that a release message is not received prior to the IP address lease timing out, and the DHCP server encounters a shortage of addresses in the pool of available addresses, the DHCP server may poll devices to which it allocated IP addresses to see if they are still active. Failure to receive a response may result in the DHCP adding the IP address assigned to the non-responding device back into the pool of available IP addresses.

Thus, unlike MAC address which are fixed for the life of a product by the manufacturer, the IP address assigned to a particular host device can change from moment to moment. Accordingly, in contrast to MAC addresses which are fixed for the life of a product by the manufacturer, there is no permanent fixed relationship between a physical device and the IP address assigned to the device.

Many contemplated IP applications could benefit from reliable information about the location and/or identity of a host device using an IP address. The dynamic allocation of IP addresses and re-use of IP addresses discussed above, greatly complicates attempts to accurately correlate specific devices and/or physical locations with an IP address.

The problem of associating IP addresses with physical locations is further complicated by the manner in which IP addresses are assigned and used. Blocks of IP addresses are assigned by the central authority to different network providers based on the size of their networks. Unlike zip codes or telephone number area codes, assignment of IP addresses is independent of geographic location. Accordingly, IP addresses do not inherently convey geographic location information as do, for example, zip codes used by the post office or the area code portion of a telephone number.

Reliable location information is also difficult to obtain in an IP network because IP based routing relies, in most cases, on the intelligence of the network to determine the routing path to a specified destination address. The host need not, and in most cases does not, know the physical location of the destination device to which it is sending packets or the route over which the transmitted packets will be conveyed. In addition, routers in an IP network usually only need to determine the next router in a path based on an IP address and therefore often do not include detailed topology information relating to large portions of an IP network. While shielding end devices and routers from having to make end to end routing decisions has many advantages, the lack of information about the physical devices corresponding to IP addresses poses problems in many contemplated IP based applications.

IP based services, those based on private internets and the larger Internet are continuing to grow in importance. IP and the Internet are beginning to be used for a wide range of applications such as music file sharing, news delivery, software distribution, etc. IP and Internet applications which are expected to grow in importance in the future include Internet telephony and video on demand services. In the case of Internet telephony voice signals are exchanged over the Internet through the use of packets including voice data.

As the use of IP addresses for a wide variety of services continues to grow, security becomes an ever-increasing issue, e.g., it is undesirable to assign IP addresses to a device based on fraudulent information. As can be appreciated, the assignment of IP addresses based on fraudulent information makes tracking an accountability difficult and has the potential of allowing an individual to steal services, e.g., Internet or other IP services in a manner that may not be traceable using existing systems.

One potential way of obtaining IP addresses assignments based on fraudulent information which has presented service providers with a problem will now be explained with reference to FIG. 16.

As discussed above, IP addresses are frequently assigned to devices on a dynamic basis. Devices requesting assignment of an IP address may be coupled to an IP network via an Ethernet or other LAN. An edge router serves to interconnect the LAN and IP based network. Assignment of IP addresses is performed by a DHCP server.

MAC addresses are used for addressing purposes in Layer 2 networks, e.g., Ethernet LANs, which communicate information using frames. In contrast, IP addresses are used for routing purposes in Layer 3 networks, e.g. IP networks, which communicate information using packets. MAC addresses are assigned by hardware manufactures and are programmed into communications devices at the time of manufacture. The manufacturer assigned MAC address is inserted by the device hardware into the header of each frame generated by the device. As a result, MAC addresses included in the headers of Ethernet frames tend to be reliable. The contents of the data portion of an Ethernet frame are determined by software which can be manipulated with relative ease. Accordingly, MAC addresses included in the data portion of frames are considerable less reliable then the MAC address in the frame header. The MAC address in the data portion of a frame is sometime faked by users seeking to hide their identity, e.g., when seeking an IP address.

In contrast to MAC addresses which are assigned by device manufacturers, IP addresses are frequently assigned to devices on a dynamic basis by DHCP servers.

Edge routers are used to couple Layer 2, e.g., Ethernet LANs, to Layer 3 networks, e.g., IP networks. In order to support routing between the two networks, the edge router normally includes two tables, e.g., a Layer 2 forwarding table and a Layer 3 to Layer 2 address resolution table. The Layer 2 forwarding table includes information associating router ports with Layer 2 (MAC) addresses. The address resolution table includes information associating IP addresses with MAC addresses.

The Layer 2 forwarding table is normally created from header information received in Ethernet frames. This is done by having the edge router store the MAC address obtained from an Ethernet frame in the Layer 2 forwarding table along with information identifying the port on which the frame including the header was received. Frames subsequently received by the edge router directed to the stored MAC address will be output via the port indicated in the Layer 2 forwarding table. Since the information in the Layer 2 forwarding table is obtained from Ethernet Frame headers it tends to be reliable.

As mentioned above, in order to communicate over an IP network, a device on an Ethernet LAN is required to first obtain an IP address. To obtain the IP address, the device sends an IP address request message to an edge router in an Ethernet frame. In response to the request, the edge router populates the Layer 2 forwarding table with the MAC information obtained from the frame's header. In addition, the edge router, normally acts as a proxy for the requesting device, and initiates a DHCP communications session between the DHCP server and the requesting device. FIG. 16 illustrates an exemplary Ethernet frame 1600 which includes a header 1612 which includes a MAC address 1602 and a payload also called a message body 1615. The payload 1615 includes data, e.g., includes an IP address request 1604 and a corresponding MAC address 1606. The data 1604, 1606 represents the body of the frame, at least the MAC address portion 1606 of which may be forwarded to a DHCP sever, e.g., by an edge router acting as a proxy for the requesting device. The MAC address 1602 in the header 1612 will normally not be forwarded to the DHCP server.

As part of the DHCP communications session, the requesting device transmits to the DHCP server a MAC address, e.g., MAC address 1606. The transmitted MAC address, included in the data field 1615 of an Ethernet frame may be faked. The DHCP server will assign an IP address based on the communicated, possibly fake, MAC address. It also stores the assigned IP address, associated MAC address and lease time information in a DHCP server database. The assigned IP address is communicated to the requesting device, along with lease time, e.g., duration (lease expiration), information by way of the edge router.

In existing systems, when an edge router receives an IP address which is not already in its address resolution table, e.g., due to the receipt of a previous message directed to the IP address, it will broadcast an ARP (address resolution protocol) message over the LAN asking for the device which owns the IP address to respond and identify itself. Normally, the device to which the IP address was assigned will respond to the ARP message with its true MAC address. The information from the ARP message response is used to populate the edge router's address resolution table. As a result of the use of ARP and a faked MAC address, the edge router's address resolution table may end up being inconsistent with the DHCP server's database.

In view of the above discussion, there is a need for methods and apparatus for monitoring improving security with regard to IP address assignments and Layer 2/Layer 3 routing tables in edge routes.

Beyond the issue of making sure IP address assignments are based on accurate MAC address information there are several other security/access control issues relating to the use of IP addresses which may be leased. These issues come up independent of the issue of possible IP address leases being based on inaccurate MAC address information.

There are a large number of applications, e.g., security related applications, where it would be useful if the physical location of a device using an IP address could be determined from its IP address in a reliable manner. However, the complexities of dynamic IP address assignment along with the complexities of determining the location of a device using an IP address have made it difficult to obtain reliable location information based on an IP address. There are still other applications which could be implemented if, in addition to device location information, a reliable device identifier such as a MAC address corresponding to a device using an IP address could be determined. Such device identification information when combined with location information could be used to provide services which require both device and location information, e.g., services such as locating stolen computer devices.

In view of the above discussion, it should be apparent that there is a need for a reliable way of determining physical location information corresponding to a device using an IP address which may have been dynamically assigned, e.g., assigned to the device for a limited time period. There is also a need for a wide range of security applications and methods assuming device location information can be determined in a reliable manner. There is also a need for various applications which require both reliable device identifier and location information.

SUMMARY OF THE INVENTION

Methods and apparatus for detecting fraudulent attempts to obtain an IP address are described. Methods and apparatus for providing security, screening and location verification services are also described. Such methods may use location information corresponding to an IP address which is obtained in accordance with various features of the invention.

In accordance with some features of the present invention, attempts to obtain IP addresses by faking a MAC address in a data portion of an IP address request message are quickly detected.

In accordance with the present invention, in embodiments where IP address assignment sessions are snooped, ARP is disabled in edge routers. In such embodiments, DHCP sessions are snooped by the edge router. The edge router populates the address resolution table using the MAC and IP addresses obtained from the snooped DHCP session. IP address lease time information obtained from snooping the DHCP session is used to control aging of the information in the address resolution table, e.g., entries are deleted when their lease time expires. Since the address resolution table is generated by snooping DHCP sessions, faked MAC addresses used to obtain IP addresses will be entered into the address resolution table. The faked MAC address will not match any of the MAC addresses included in Layer 2 forwarding table since the Layer 2 forwarding table is generated from the true MAC addresses obtained from frame headers.

When an address resolution table look-up operation results in a MAC addresses which is not found in the Layer 2 forwarding table, the corresponding IP packet is dropped by the edge router. As a result, devices which obtain IP addresses using fake MAC addresses are denied the receipt of packets directed to the IP address obtained using the fake MAC address.

As an enhanced security feature, before initiating a DHCP session, the edge router, in some embodiments, compares the MAC address in the body of an IP address assignment request message to the MAC address in the header portion of the frame including the request message. If there is a miss-match between the MAC in the header and the body of the frame, a fraudulent attempt at obtaining an IP address is declared and the appropriate security measures taken, e.g., the request is not forwarded to the DHCP server and security personnel are notified of the fraud.

Other security features of the invention relating to security screening, access control and location verification will now discussed.

There are a large number of applications where it would be beneficial to be able to identify the physical location and/or a physical device using an IP address at any given time. The methods and apparatus of the present invention are well suited to such applications.

The present invention is directed to methods and apparatus for determining, in a reliable manner, a port, physical location and/or device identifier associated with a device using an IP address and for using such information, e.g., to support one or more security applications. IP addresses which can be used in conjunction with the method of the invention may be dynamically assigned to a device by a server for a particular time period, e.g., least time, after which it may be assigned to another device.

In accordance with one embodiment of the present invention, the IP service provider maintains a table associating particular edge router ports with physical locations serviced by those ports. In the case where an identified port of an edge router is connected to a wired LAN or wireless LAN limited to a small geographic region, e.g., a single office, residence, or other known physical location, the identified port can be correlated to the physical location to which it is connected, e.g., through a simple look-up table operation. This is similar to associating a particular POTS telephone line to a specific business location or residence. Since the port connection is controlled by the IP network service provider, the location information associated with the port connection will tend to be relatively reliable and difficult to falsify.

Reliable device identification information, e.g., MAC address information, can be retrieved in accordance with the invention in addition to location information. In various embodiments, a MAC address of a device using a particular IP address and, optionally, IP address lease time information is determined from the edge router through which the device connects to the IP network. Alternatively, MAC address information is obtained from a server, e.g., DHCP server responsible for IP address assignments, which includes information associating IP addresses with MAC addresses. This information, which is generally reliable particularly when obtained from the edge router, is used in various embodiments along with physical location information to provide a variety of security related services.

Exemplary applications/services in which the invention may be used include limiting access to a service via an IP network to devices located at a particular physical location. This may be for licensing or other reasons, e.g., to reduce the risk of an unauthorized user getting access to a system using stolen passwords and/or account information. For example, a company may wish to limit an employee's, e.g., manager's, ability to access a corporate network to a manager's home residence. A bank may wish to limit, for security reasons, an Internet banking customer's ability to conduct certain transactions to transactions initiated from the customer's residence. An even more important application may be for screening/authorizing access to a pay service such as a Video-On-Demand (VOD) service.

From a service providers perspective, it is beneficial if a service provider can provide a service to customers at particular locations without having to require special security procedures on the customer's part, special user device software, encryption keys or other special device identifiers. By authorizing locations as opposed to devices, many services can be provided without the complexities of activating/registering a particular device for use with a service prior to use. The location based service authorization process of the invention provides a much more customer friendly approach to providing services than current device specific security systems, e.g., satellite systems, where specific receivers must be registered for use and activated by being programmed with a device specific encryption key.

In accordance with one embodiment of the present invention, screening of attempts to obtain a service, e.g., video-on-demand, music or other type of subscription or pay service is provided based on a determination of the location of the requesting device as determined from the IP address being used and/or from the edge router port through which the service is being requested. Screening based on edge router device location information, e.g., edge router port information or information derived from an edge router port identifier such as physical location information associated with an edge router port, can be performed in the IP network, e.g., in the edge router or in front of a service provider's server. This provides the IP network provide the opportunity to collect revenue from a service provider for the security service while removing the burden of providing screening service requests and/or authenticating user devices from the end service provider. This allows the service provider to focus on providing the service in which it specializes without the need to address security/authorization concerns which are handled by the IP network service provider in accordance with the invention. While described as being implemented in front of the particular service provider's server, the screening/authorization function can, and in various embodiments is, incorporated into the end service provider's server with the necessary edge router and port or location information being supplied in accordance with the methods of the present invention.

In addition to location based authorization/screening applications, the methods of the present invention are applicable to a wide range of other security and/or law enforcement applications. In the case of one law enforcement application, a parole supervisor or automated system is used to check on the location status of parolees who contact the supervisor/automated system to make sure that the monitored parolee is initiating the IP based communication from a particular physical location, e.g., the parolee's home where he/she is supposed to be at some specific time, e.g., each night. The same system can be used to check that a security guard checks in at scheduled times from various pre-selected locations while, e.g., making periodic rounds a site being guarded.

The methods of the present invention can also be used to identify the physical location of a hacker based on the hacker's IP address and/or to locate the physical location of a stolen item, e.g., notebook computer with a modem or network card having a pre-assigned MAC address, which uses an IP address to communicate over an IP based network. In one stolen goods location determination embodiment, MAC addresses of devices are compared to a list of stolen MAC addresses, e.g., when a DHCP server is contacted for IP address assignment purposes. If a match is determined between a MAC address of a stolen device and a device which is in use, the location of the device is determined and law enforcement and/or the owner of the stolen device is notified.

In terms of providing services, e.g., music over IP services, VOD services, etc., it can be desirable to license a particular physical site, e.g., home location, but not others. In such a case, it might to desirable to allow any device at the particular licensed location, e.g., a customer residence, to obtain the licensed service while blocking attempts from others to gain access to the service from other unlicensed locations, e.g., other houses.

Numerous additional embodiments, features and applications for the methods and apparatus of the present invention are discussed in the detailed description that follows.

BRIEF DESCRIPTION OF THE DRAWINGS

FIG. 18 illustrates an exemplary subscriber/service information database which may be sued by the security server of FIG. 17.

DETAILED DESCRIPTION

Figure 1:
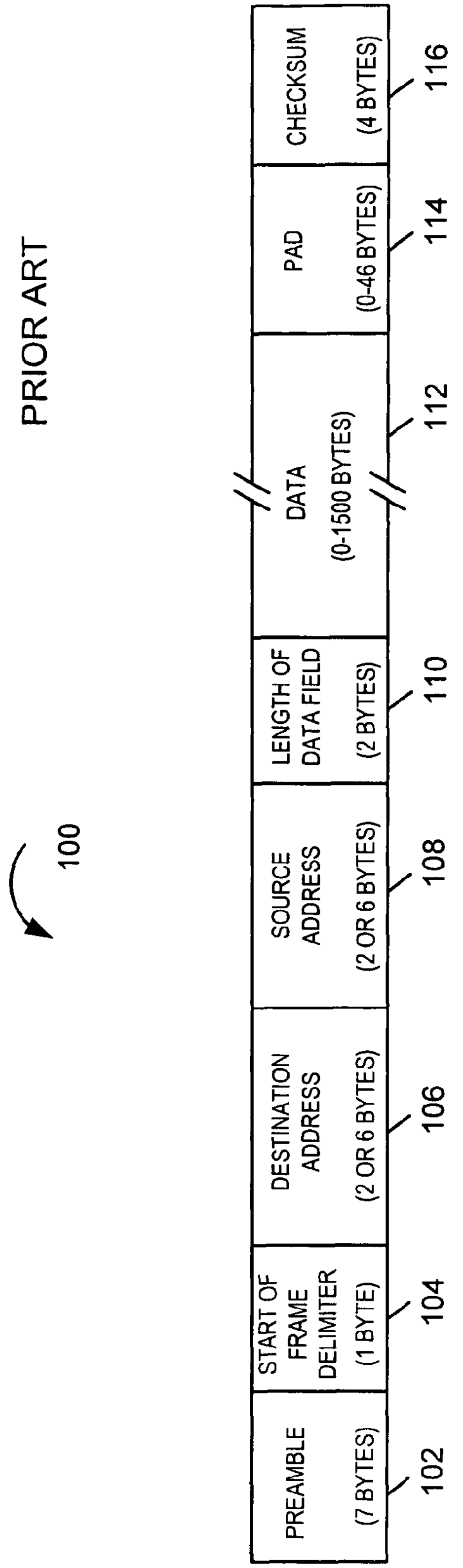
FIG. 1 illustrates an Ethernet frame.
Figure 2:
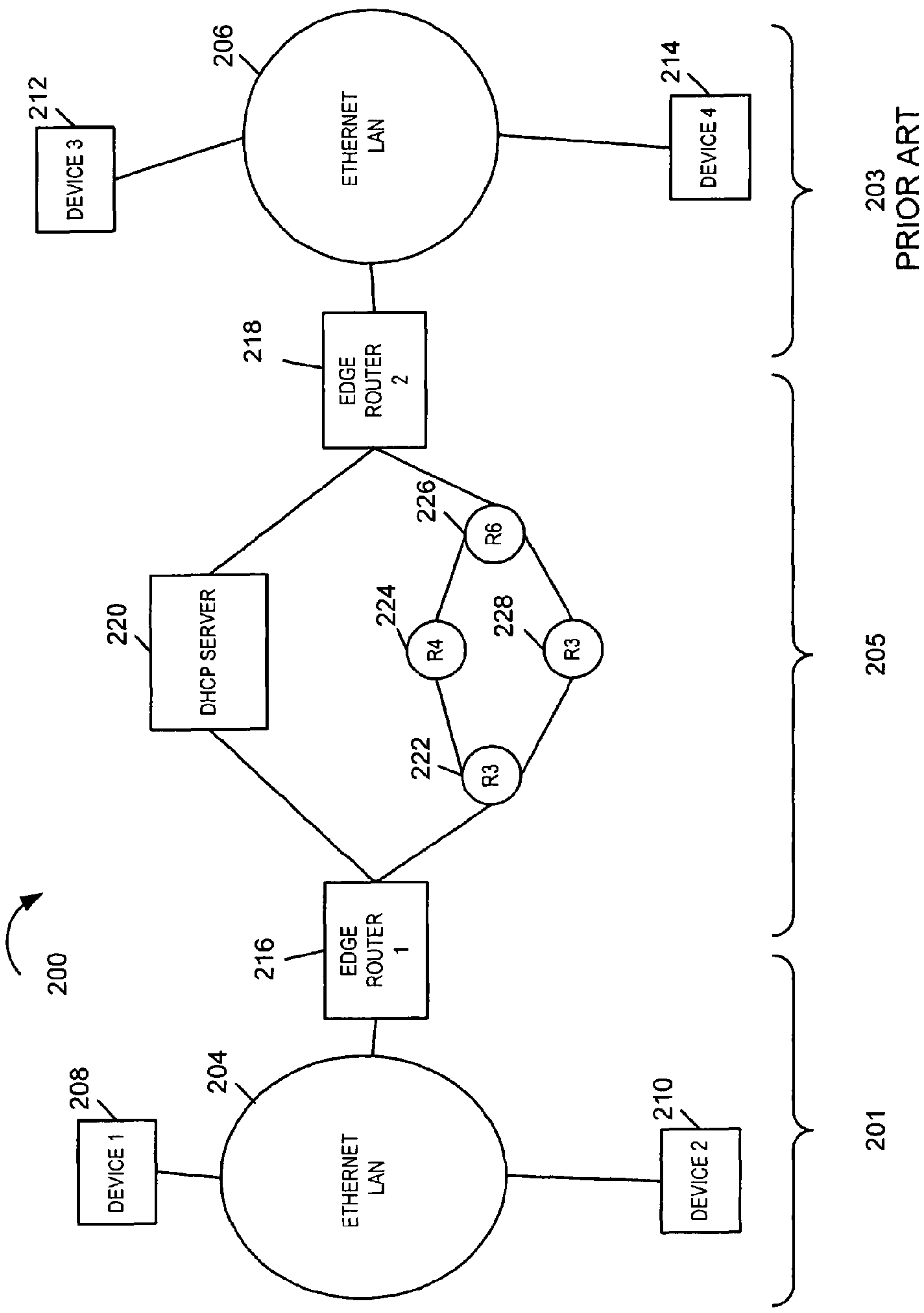
FIG. 2 is a simplified Internet diagram.
Figure 3:
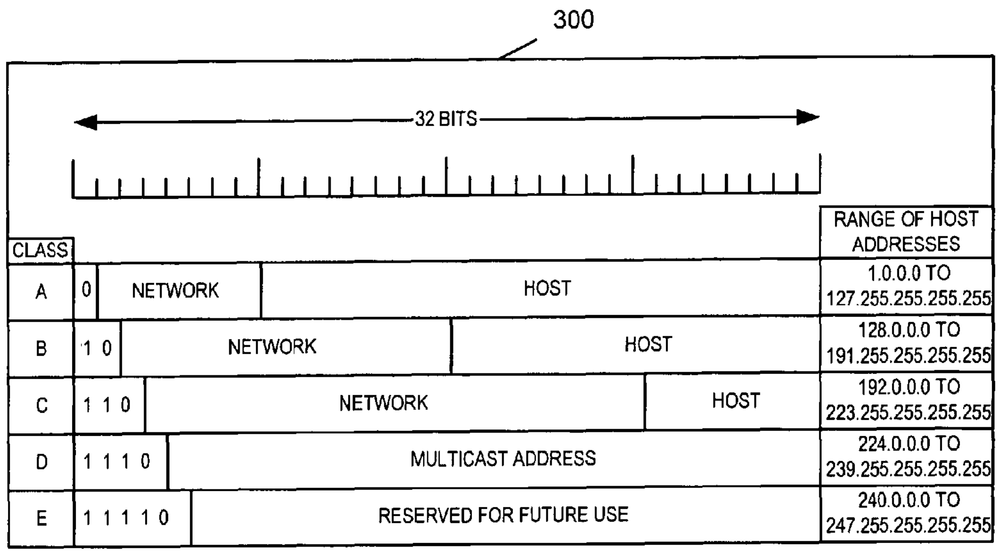
FIG. 3 illustrates the 32 bit IP addressing scheme used for Internet addresses.
Figure 4:
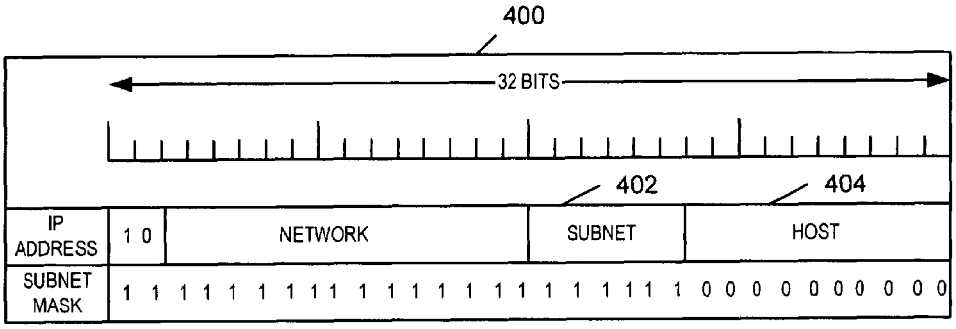
FIG. 4 illustrates the components of a 32 bit Internet address having the illustrated subnet mask.
Figure 5:
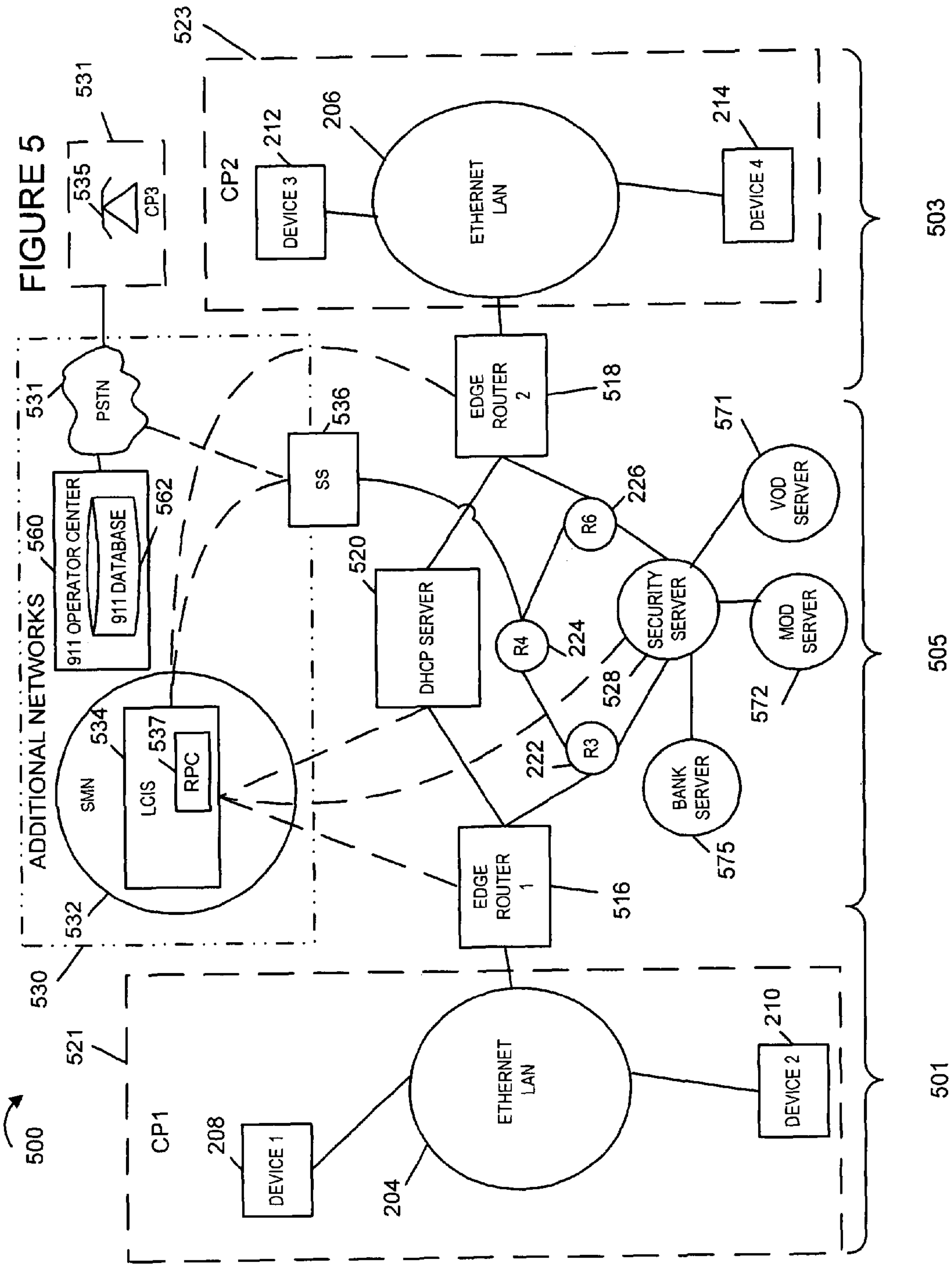
FIG. 5 illustrates a communications system implemented in accordance with the invention.

FIG. 5 illustrates a communication system 500 implemented in accordance with the present invention. As will be apparent from a review of FIG. 5, the communication system 500 has many elements which are the same as or similar to the elements of the existing Internet as shown in FIG. 2. Elements in FIG. 2 and FIG. 5 which are the same as, or similar to, one another are indicated using the same reference numbers in both figures. Such elements will not be described again in detail.

The system illustrated in FIG. 5 includes first and second Layer 2 networks 501, 503, e.g., Ethernet LANs, coupled together by a Layer 3, e.g., IP based, network 505. In addition to the IP based network 505, the system 500 includes additional networks 530. The additional networks include a service management network (SMN) 532 and a public switched telephone network 531. One or more conventional (e.g., non-IP) telephone devices may be coupled to the PSTN 531. A 911 operator center 560 which includes a 911 database 562 is shown coupled to the PSTN 531 but may be implemented as part of the PSTN. The 911 database 562 includes customer and address information associated with telephone numbers. The database 562 is accessed and used to determine a caller's location in the case of a 911 emergency call. In FIG. 5, for purposes of illustration, a single telephone 535, located at a customer premise 531, is shown coupled to the PSTN 531. In reality many such telephone devices located at different customer premises are coupled to the PSTN 531.

The first Layer 2 network, e.g., LAN 501, includes host devices 208, 210 coupled to Ethernet bus 204. The LAN 501 is located at a first customer premise (CP) 521. Similarly, the second Layer 2 network 503 including host devices 212, 214 coupled to Ethernet bus 206. The LAN 503 is located at a second CP 523. Each CP 521, 523, corresponds to a single physical location, e.g., an office building or home, for which location information can be stored in the SMN 532.

An IP based network 505 couples the first and second Layer 2 networks 501, 503 together. The IP based network 505 includes first and second edge routers 516, 518, a DCHP server 520, core routers 222, 224, 226, a security server 528, a video-on-demand (VOD) sever 571, a MOD server 573, banking server 575 and a soft switch (SS) 536. The security sever 528 operates as a security and/or authorization device for VOD sever 571, MOD server 533 and bank server 535. As will be discussed below, it also operates as a security device with the ability to detect the use of stolen devices and report the use/location of stolen devices to the owner and/or appropriate law enforcement authorities. The sever 528 also servers as a location verification device in some embodiments. In addition to these functions the server 528 operates as a router forwarding packets between the other nodes of the network, e.g. routers R3 222 and R6 226. Security server 528 is coupled to the LCIS 534 via a secure communications link. This allows the security server 528 to direct information requests to the LCIS 534 and receive information from the LCIS 534 in a secure and reliable manner.

The first and second edge routers 516, 518 serve as the interface between the Ethernet LANs 501, 503, respectively, and the IP 505. While the edge routers 516, 518 perform the same functions as edge routers 216, 218 as will be discussed further below, they also include routines for responding to requests to identify a router port corresponding to an IP or MAC address supplied as part of a port information request.

The DHCP server 520 is responsible for dynamically assigning IP addresses while the SS 536 is responsible for interfacing between the IP network 505 and public switched telephone network (PSTN) 531. The soft switch stores information associating IP address of telephone devices with telephone numbers. It is responsible for routing IP telephone calls between IP telephone devices over the IP network 505 and for performing the necessary protocol conversions required to bridge and route telephone calls between the IP domain and the PSTN 531. Routing of telephone calls between the IP and PSTN domains may be required, e.g., when a telephone call between an IP device and a conventional PSTN telephone occurs.

To facilitate the secure exchange of customer and management information between system components, e.g., routers and servers in the system 500, the system 500 includes a secure management network (SMN) 532. The SMN 532, which may be implemented using IP, is in addition to the Layer 3 network 505.

As an alternative to using a separate network for the exchange of management and customer information, secure communications channels can be implemented between system components, e.g., routers and servers, using encryption and/or other virtual private networking techniques. Accordingly, customer and management information may be transmitted over separate physical communications channels or secure communications channels provided using existing communications links between network elements.

Various elements are incorporated into the SMN 532 including a location and customer information server (LCIS) 534 implemented in accordance with the invention. As will be discussed below, in accordance with the present invention, the LCIS 534 includes a router-port to customer information (RPC) database 537. The RPLC database 537 includes sets of customer records created, e.g., when a customer subscribes to an IP service provider. As will be discussed below each record may include, e.g., customer premise location information, name, address and land-line telephone number information. Each customer record is correlated to an edge router and port which is assigned to be used by the customer when accessing the IP network via a LAN or other connection. The RPC database 537 may also include IP address and address lease time information corresponding to a customer. This information, in some embodiments, is populated with information obtained from an edge router and/or the DHCP server. Such information may be retrieved and stored in response to an information request including an IP address of interest (IP-AOI) received from another device, e.g., security server 528.

For various applications, e.g., authentication/authorization of services, servicing of 911 emergency telephone calls, the SS 536 and/or other network devices such as security server 528, coupled to the SMN 532 may request the location and/or other customer information associated with a particular IP address of interest (IPAOI). The IPAOI may be, e.g., the IP address used to initiate a 911 call from an IP telephone or the IP source address of a packet directed to a premium service provider, e.g., VOD server 571, MOD server 573 and/or bank server 575. As will be discussed below, the LCIS 534 includes routines for responding to such information requests and returning relevant information to the requesting device, e.g., server.

Figure 6:
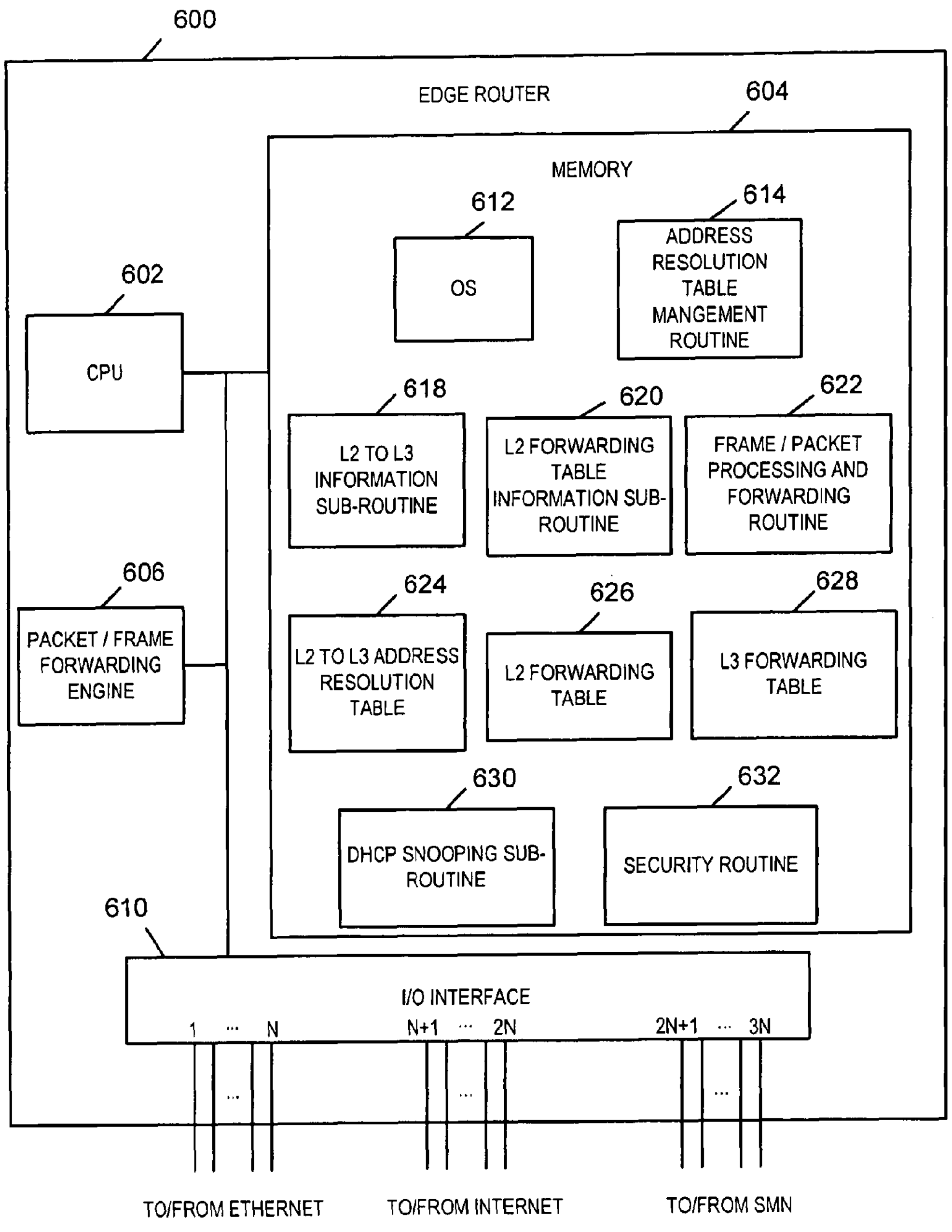
FIG. 6 illustrates an edge router implemented in accordance with the invention.

FIG. 6 illustrates an edge router 600 which may be used as any one of the edge routers 516, 518 of the system illustrated in FIG. 5. As illustrated, the edge router 600 includes a CPU 602, packet/frame forwarding engine 606, memory 604 and I/O interface 610 which are coupled together by a bus. The I/O interface 610 includes a plurality of ports used to connect the edge router 600 to various networks. Ports 1 through N are used to couple the router 600 to one or more Ethernet LANs. Ports N+1 through 2N are used to connect to elements of the IP network 505, e.g., DHCP server 520 and router R3 522 or R6 526, while Ports 2N+1 through 3N are used to couple the edge router 600 to the SMN and thus the LCIS 534 included therein.

The memory 604 includes an L2 forwarding table 626, an L3 forwarding table 628, an L2 to L3 address resolution table 624, a frame/packet processing and forwarding routine 622, an operating system 612, address resolution table management routine 614, port number information routine 618, DHCP snooping sub-routine 630 and security routine 632.

The Layer 2 forwarding table 626 includes information used for forwarding received Ethernet frames according to the MAC destination address specified in the frame's header.

Figure 7:
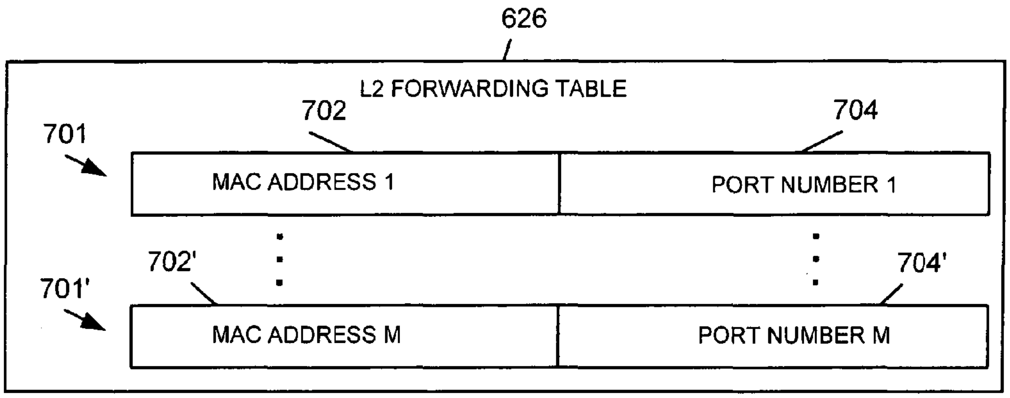
FIGS. 7-9 illustrate various tables included in the edge router of FIG. 6.

FIG. 7 illustrates an exemplary L2 forwarding table 626. The table includes a plurality of entries 701, 701'. Each entry includes a MAC address 702, 702' and a port number 704, 704'. Under direction of the forwarding routine 622, frames received by the edge router having a MAC address listed in the L2 forwarding table are output using the port 704, 704' corresponding to the destination MAC address. In this manner Ethernet frames are forwarded in the Layer 2 domain based on MAC destination addresses.

Figure 8:
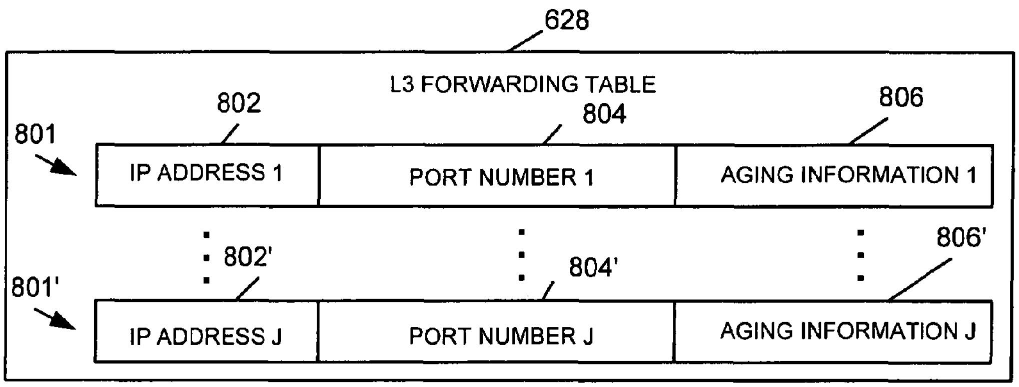

The Layer 3 (L3) forwarding table 628 is used by the router 600 to forward IP packets in the IP domain. As illustrated in FIG. 8, the L3 forwarding table includes a plurality of entries 801, 801'. Each entry includes an IP address 802, 802', a port number 804, 804' and aging information 806, 806'. The aging information is used to determine when an entry 801, 801' should be deleted from L3 forwarding table as part of a table maintenance operation. Under direction of the forwarding routine 622, IP packets received by the edge router 600 having a MAC address listed in the L2 forwarding table are output using the port 804, 804' corresponding to the destination IP address. In this manner IP packets are forwarded in the Layer 3 domain based on IP addresses.

Figure 9:
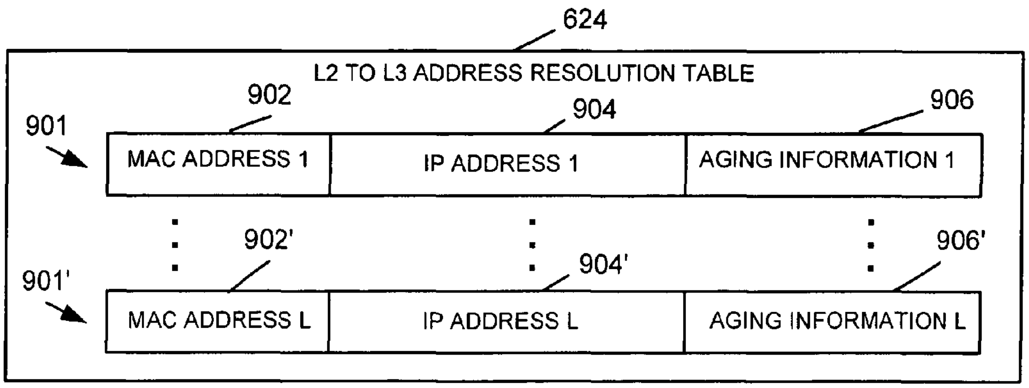

The L2 to L3 address resolution table 624, shown in FIG. 9, is used for converting between Layer 2, e.g., MAC, addresses and Layer 3, e.g., IP, addresses. The L2 to L3 address resolution table 624 includes a plurality of entries 901, 901'. Each entry includes a MAC address 902, 902', an IP address 904, 904' and aging information 906, 906'. As in the case of the L3 forwarding table 628, the aging information 906, 906' is used for table maintenance purposes.

When an IP packet is received which has a destination address not found in the L3 forwarding table 628, the forwarding routine 622 compares the received IP destination address to the entries in the L2 to L3 resolution table 624. If the IP address is listed in the table 624, the MAC address 902 or 902' corresponding to the received destination IP address 904 or 904', respectively, is retrieved from the L2 to L3 address resolution table. The MAC address is then used in a L2 forwarding table look-up operation. Using the MAC address as an index to the L2 forwarding table, an output port to be used for forwarding the information included in the received IP packet is determined. As part of the forwarding operation, content from the received IP packet is placed into the payload of an Ethernet frame and then transmitted to the appropriate Ethernet LAN via the port identified in the L2 forwarding table. In this manner, IP packets received from the IP network can be transmitted to devices over the Ethernet LAN coupled to the edge router 600.

In accordance with one feature of the invention, as an alternative to using address resolution protocol (ARP), the DHCP monitoring routine 630 snoops DCHP sessions between devices on the Layer 2 network, e.g., devices 208, 210 and the DHCP server 220. In this manner, the monitoring routine 611 obtains information on the assignment of IP addresses to devices and the release of IP address by devices. This information is conveyed to the address resolution table management routine 614 which updates the layer 2 to layer 2 (L2 to L3) address resolution table 624.

Address resolution table management routine 614 is responsible for removing, e.g., deleting, entries from the L2 to L3 address resolution table 624 and/or L3 forwarding table, after an entry has aged for a preselected period of time as indicated from the aging information stored for each entry. Alternatively, in the case where DCHP sessions are snooped in accordance with one feature of the invention, entries are deleted from tables 624 and 628 when the IP lease time expires, a device releases an IP address, or a device fails to respond to a DHCP status inquiry. Thus, in such an embodiment, IP address entries are added to and deleted from tables 624, 628 based on information obtained from snooping communications between host devices on a layer 2 LAN coupled to the edge router 600 and the DHCP server 220.

Port number information routine 618 responds to port number information requests received by the edge router 600 by returning the port number corresponding to an IP address or MAC address received in a port number information request.

The routine 618 first determines whether an IP or MAC address has been received in a port number information request. If the request includes a MAC address, the received MAC address is used as an index into the L2 forwarding table to determine the router port corresponding to the received address. If an IP address is received as part of a port number information request, the IP address is first used as an index as part of a look-up into the L2 to L3 address resolution table 624. In this manner the MAC address corresponding to the received IP address is determined from the table 624. Once the MAC address is determined from table 624 it is used to consult the L2 forwarding table 626. In this manner, the router port corresponding to the MAC address is determined.

The router port number determined by port number information routine 618 is returned to the device which sent the router 600 a port number information request. In the case of a port number information request from the LCIS 534, the determined port number would normally be returned via the secure SMN 532 via which the request was received by the edge router 600.

Figure 10:
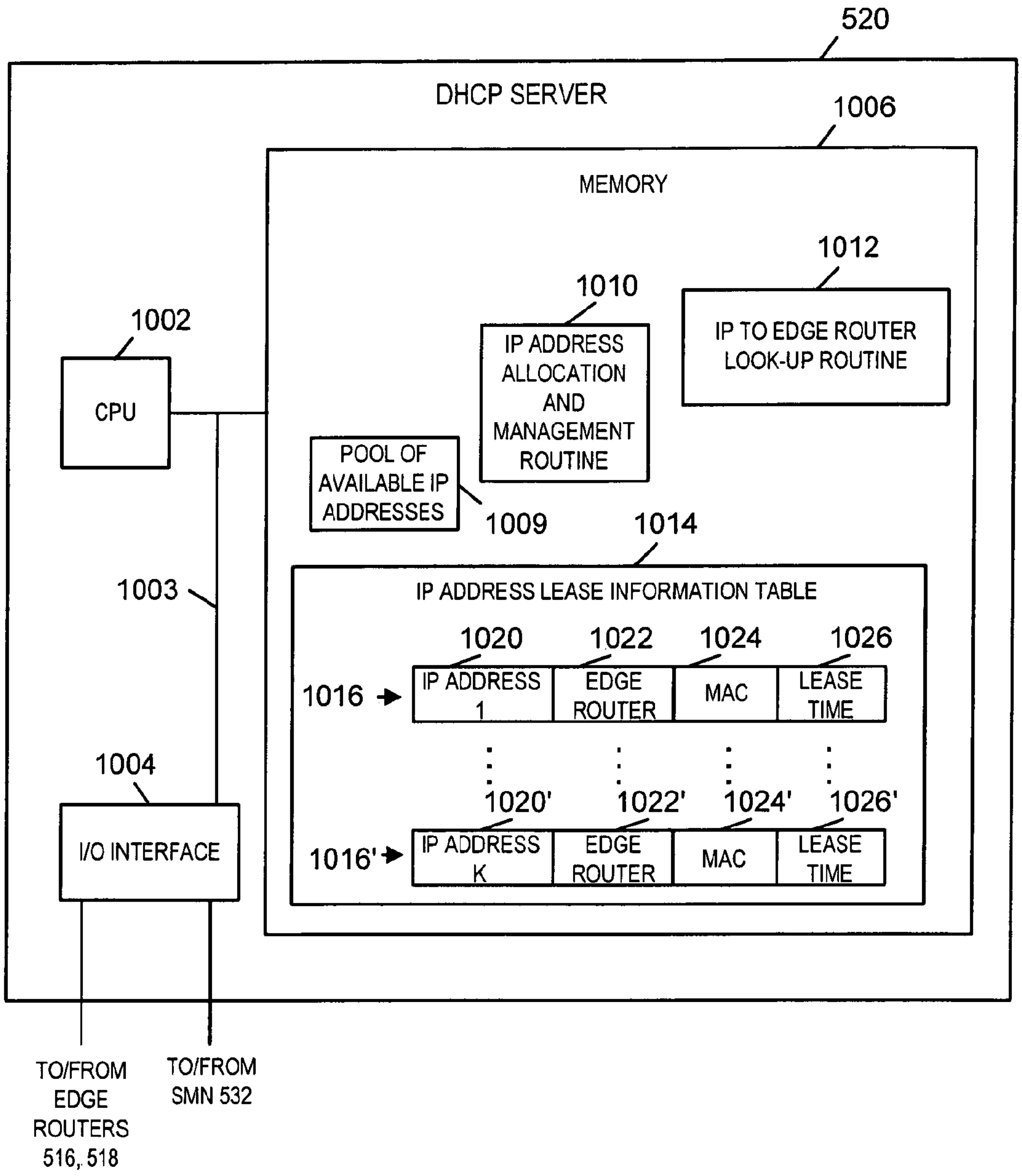
FIG. 10 illustrates a DHCP server responsible for dynamically assigning IP addresses and for storing information relating to said addresses in accordance with the present invention.

FIG. 10 illustrates a DHCP server 520 implemented in accordance with the present invention. As illustrated, the DHCP server 520 includes a CPU 1002, I/O interface 1004 and memory 1006 which are coupled together by bus 1003. The memory 1006 includes an IP address allocation and management routine 1010, IP to edge router and optionally MAC address look-up routine 1012, a pool of available IP addresses 1009, and an IP address lease information table 1014. The pool of available IP addresses 1009 is a list of unused IP addresses which the DHCP server 520 is authorized to lease to requesting devices. In accordance with the invention, the table 1014 is used to manage leased IP addresses and as an IP to edge router (IP2ER) look-up table for providing information on the edge router associated with an IP address.

When a device on a LAN, e.g., device 208 on LAN 204, needs an IP address so that it can access the IP network 505 it broadcasts an IP address assignment request. The request is detected by the edge router on the LAN, e.g. router 216. The edge router 516 responds by acting as a proxy of the requesting device 208 and initiating a DHCP session with the DHCP server 520.

This may be done as is known in the art using DHCP protocol. An IP address assignment request conveyed to the DHCP server 520 includes the MAC address of the requesting device. In response to an IP address assignment request, the DHCP server 520 assigns the requesting device 208 an available IP address from the pool 1009. In addition the server 520 removes the address from the pool 1009 and creates a new entry 1016 in the IP address lease information table 1014.

Each entry 1016, 1016' in the table 1014 includes the IP address assigned 1020, 1020', the edge router 1022, 1022' acting as proxy for the requesting device, the MAC address 1024, 1024' of the device to which the IP address was assigned, and lease time information 1026, 1026'. The lease time information 1026, 1026' indicates the term, e.g., duration, of the IP address lease and other lease related information. One entry 1016 or 1016' exists in the table 1014 for each IP address leased to a device by the DHCP server 520. In the exemplary embodiment of FIG. 10, the table 1014 includes entries for K leased IP addresses 1620 through 1620'.

When an IP address is assigned, i.e., leased, to a requesting device, the IP address and lease time information (indicating the duration of the lease) is communicated back to the requesting device by way of the edge router acting as the device's proxy.

Accordingly, as part of the DHCP server IP address leasing mechanism, a table 1014 associating assigned IP addresses with information identifying the edge router used by the device assigned the IP address to access the IP network 505 and the devices MAC address.

Edge router information requests, e.g., requests from the LCIS 534, may be received by the DHCP server 520 via SMN 532. IP to edge router look-up routine 1012 is responsible for responding to such requests by correlating an edge router to an IP address received in the information request. To determine the edge router corresponding to an information request, the look-up routine 1012 accesses the IP address lease information table 1014 using the received IP address as an index into the table. In this manner, the look-up routine 1012 retrieves the information 1022, 1022' identifying the edge router corresponding to the received IP address. In some embodiments, the routine 1012 also recovers from the table 1014, the MAC address corresponding to the received IP address. The information identifying the edge router, and, optionally, the MAC address, corresponding to a received IP address is returned to the device, e.g., LCIS 534, which sent the edge router information request to the DHCP server. In this manner, devices such as the LCIS can obtain from the DHCP server information identifying the edge router being used by a device having a specific IP address.

Figure 11:
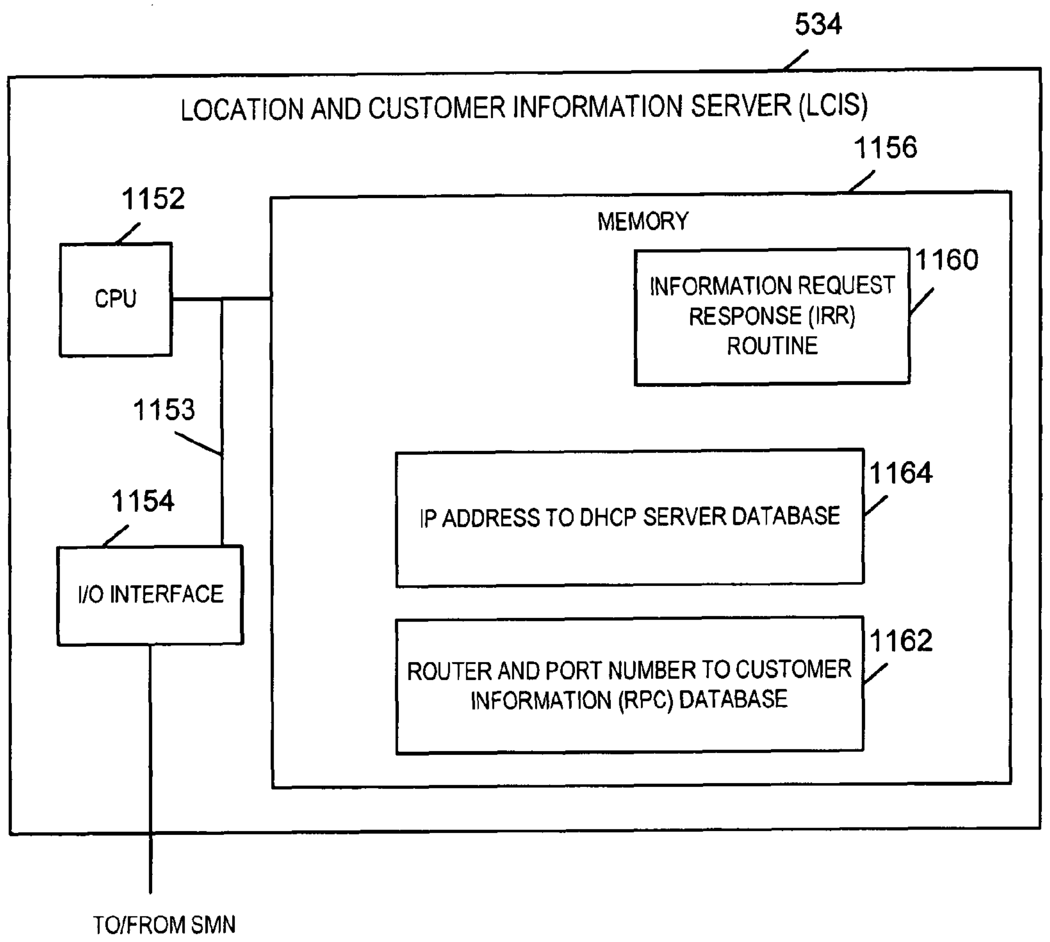
FIG. 11 illustrates a location and customer information server (LCIS) implemented in accordance with the invention.

FIG. 11 illustrates a location and customer information server (LCIS) 534 implemented in accordance with the invention. For security reasons, the LCIS 534 is implemented as part of the SMN 532. However, it could, alternatively, be implemented as a device on the IP network 505 assuming sufficient security measures are taken, e.g., the use of a firewall and/or data encryption, to protect the server and its contents from unauthorized access and/or tampering.

The LCIS 534 includes a central processing unit 1152, I/O interface 1154 and memory 1156 which are coupled together by bus 1153. The CPU 1152 controls operation of the LCIS under direction of one or more routines stored in memory 1156. The I/O interface 1154 couples the internal components of the LCIS 534 to external devices via the communications links of the SMN 532. For example, in the FIG. 5 embodiment, the LCIS 534 is coupled to the edge routers 516, 518, SS 536 and DHCP server 520 via communications links of the SMN 532.

The memory 1156 includes an IP address to DHCP server database 1164, and an edge router and port number to customer information (RPC) database 1162, and an information request response routine 1160.

The IP address to DHCP server database 1164, includes information correlating IP addresses which may be assigned by DHCP servers to particular DCHP servers in the IP network. Thus, the LCIS 534 is able to determine which DHCP server 520, out of a plurality of such servers, to contact for information regarding an IP address received as part of an information request.

The RPC database 1162 includes information correlating specific edge routers and ports to customer information including, e.g., physical location, name and landline telephone number information.

Figure 12:
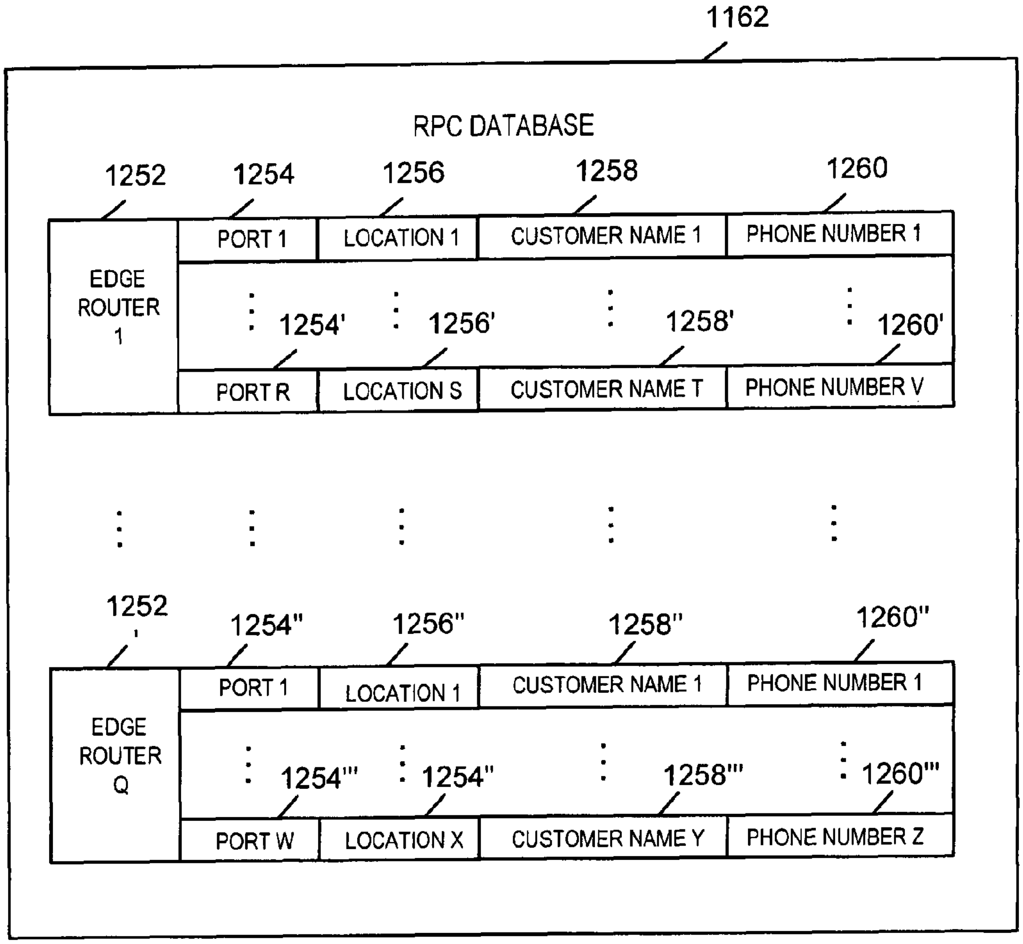
FIG. 12 illustrates a router and port number to customer (RPC) information database implemented in accordance with the invention.

FIG. 12 illustrates an exemplary RPLC database 1162. As illustrated the exemplary database includes Q records one record corresponding to each of Q edge routers. Each record includes a router identifier 1252, 1252' and a set of entries corresponding to particular router ports. Each router port entry includes a port identifier 1254, a location identifier 1256, customer name information 1258 and telephone number information 1260. The location information is the location of the customer premise, e.g., physical LAN location, from which the customer may access the IP network via the identified router and port. The phone number 1260 is the telephone number of a landline phone located at the corresponding physical location specified in the edger router/port entry. Additional customer information, e.g. billing, service subscription and level of desired privacy information, may also be included in the RPLC database 1162 for each router/port entry. The RPLC database 1162 is populated as subscribers contract with an IP service provider for IP service and is updated, e.g., periodically, to reflect changes in the customer information and/or the cancellation or modification of service.

The information request response routine (IRR) 1160 responds to requests for location and/or other customer information corresponding to an IP address. The IP address of interest and, optionally, the desired type of information, is included in an information request. Such information requests may come from a variety of sources, e.g., routers and/or servers implementing security routines, soft switch 536, etc.

Figure 13:
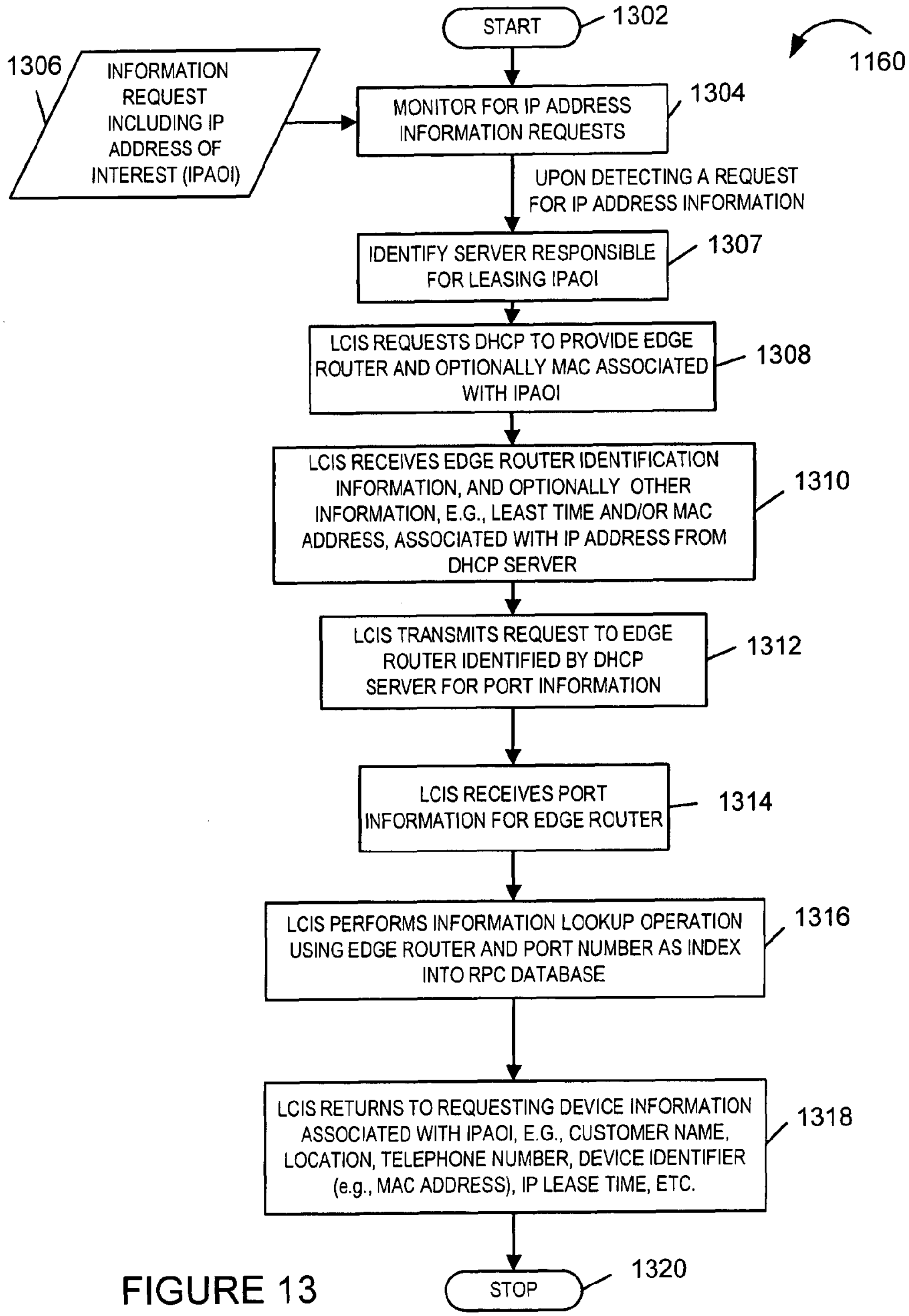
FIG. 13 illustrates a routine for providing customer information corresponding to an IP address in response to information requests.

An exemplary IRR routine 1160 will now be discussed with reference to FIG. 13. The IRR routine 1160 begins in step 1302 where it is executed by the CPU 1152, e.g., when the LCIS 534 is activated. Then in step 1304 the routine 1160 monitors for an information request 1306 including an IP address of interest (IPAOI). For each such detected IP address information request, operation proceeds to step 1307.

In step 1307 the LCIS 534 identifies, e.g., by querying its IP address to DHCP server database 1164, the DHCP server responsible for leasing the IPAOI to a device. Then, in step 1308, the LCIS 534 sends a message, including the IPAOI, to the identified DHCP server requesting information, e.g., edge router and MAC address information, corresponding to the IPAOI.

In step 1310, in response to the information request sent to the DHCP server, the LCIS 534 receives edge router identification information and, in some embodiments, the MAC address of the device to which the IPAOI was leased. Then in step 1312, the LCIS 534 transmits a request to the edge router identified by the DHCP server for port information relating to the IPAOI. The port number information request transmitted to the identified edge router includes, when available, the MAC address received from the DHCP server in addition to, or instead of, the IPAOI.

In response to the port information request message, in step 1314, the LCIS 534 receives from the contacted edge router, the edge router port number corresponding to the supplied IPAOI or MAC address. Then, in step 1316, the LCIS 534 accesses the RPLC database 1162 using the router and port number corresponding to the IPAOI to retrieve therefrom the requested location and/or customer information determined to correspond to the IPAOI.

Once the desired information, e.g., customer name, location, telephone number is retrieved from the RPLC database, in step 1318 it is returned to the device which requested information corresponding to the IPAOI. The MAC address may also be returned to the requesting device where device identification information is desired.

Once the requested information corresponding to the IPAOI has been transmitted to the requesting device, e.g., over the secure SMN 532, processing of the received IP address information request stops in step 1320. However, the monitoring operation of step 1304 and processing of other IP address requests will continue until the routine 1160 is terminated, e.g., by the LCIS 534 being turned off or shut down.

Various features and methods of the present invention designed to reduce security risks associated with attempts to obtain IP address assignments using faked MAC addresses, will now be explained with reference to FIGS. 14 and 15. In accordance with the present invention, attempts to obtain IP addresses by faking a MAC address in a data portion of an IP address request message are quickly detected and/or rendered of little use to the requesting device since IP packets directed to a fraudulently obtained IP address will be dropped by an edge router rather than forwarded over an Ethernet.

As discussed above, in accordance with the present invention, in embodiments where edge routers snoop IP address assignment sessions, ARP is disabled in edge routers. The edge router populates the address resolution table using the MAC and IP addresses obtained from the snooped DHCP session. Lease time information obtained from snooping the DHCP session is used to control aging of the information in the address resolution table, e.g., entries are deleted when their lease time expires. Since the address resolution table is generated by snooping DHCP sessions, faked MAC addresses used to obtain IP addresses will be entered into the address resolution table. The faked MAC address will not match any of the MAC addresses included in Layer 2 forwarding table since the Layer 2 forwarding table is generated from the true MAC addresses obtained from frame headers.

Figure 14:
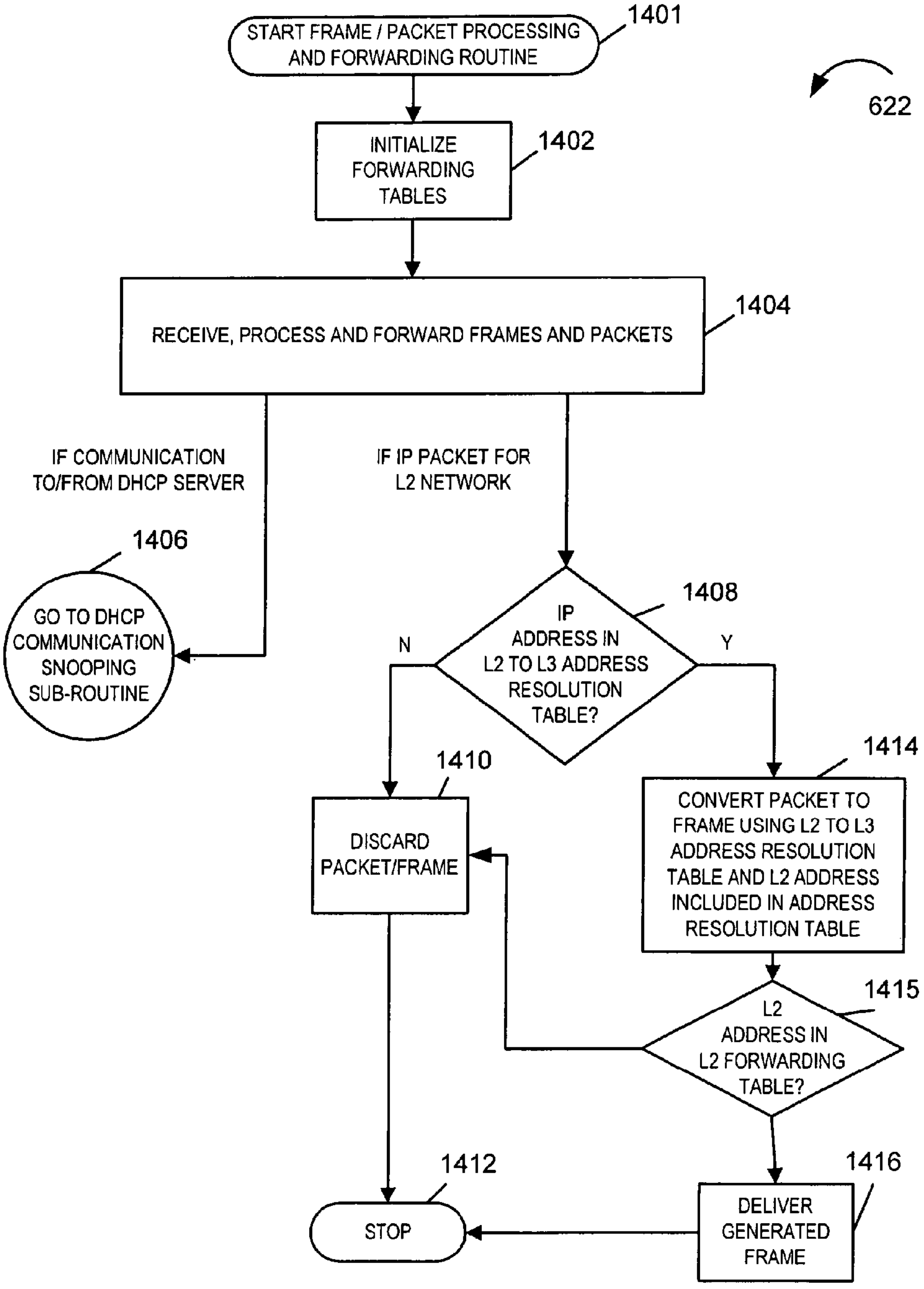
FIG. 14 illustrates a frame/packet processing and forwarding routine implemented, e.g., by an edge router, in accordance with the present invention.
Figure 15:
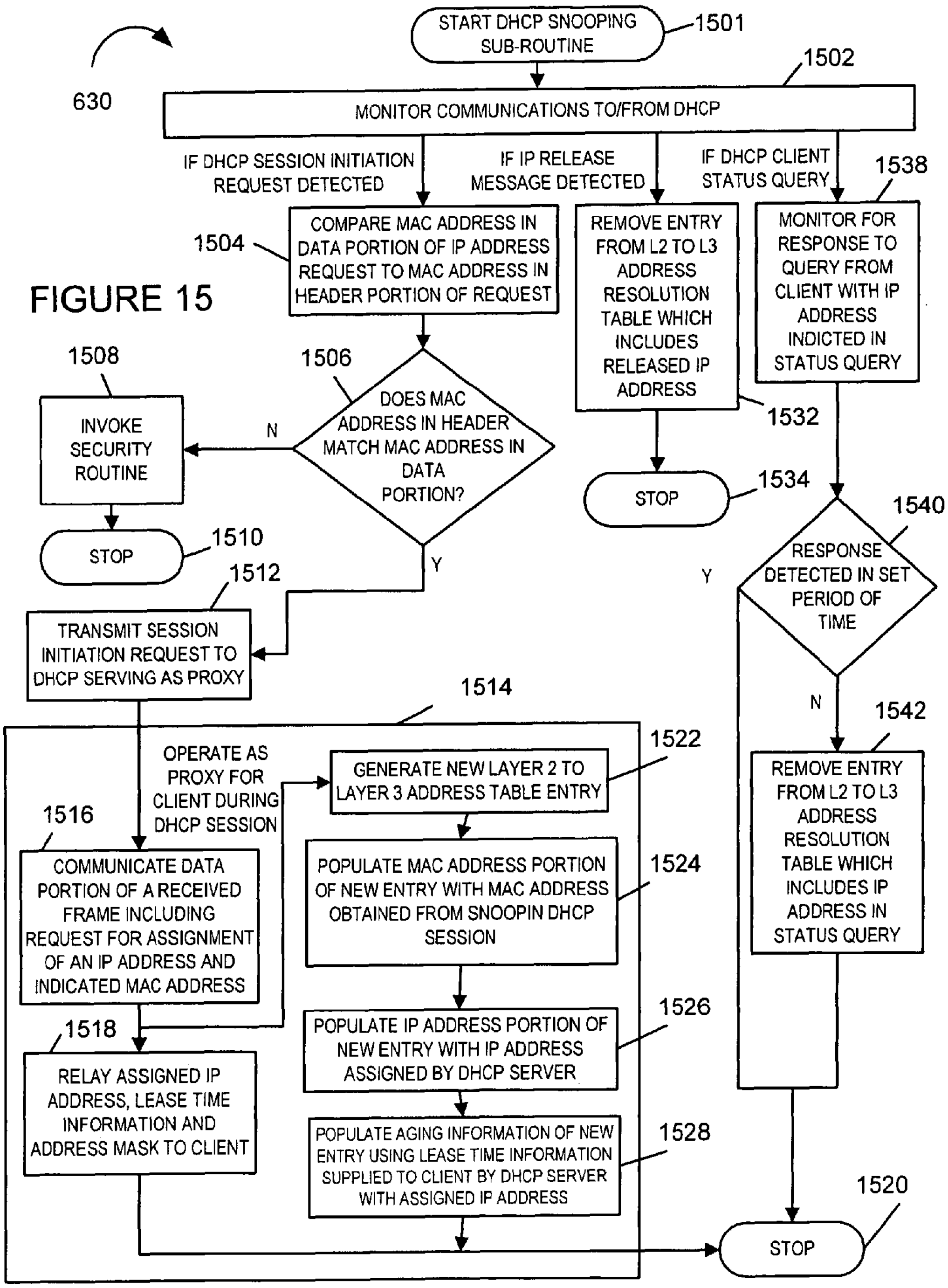
FIG. 15 illustrates the steps of a DHCP snooping subroutine of the present invention which may be used in conjunction with the routine shown in FIG. 14.
Figure 16:
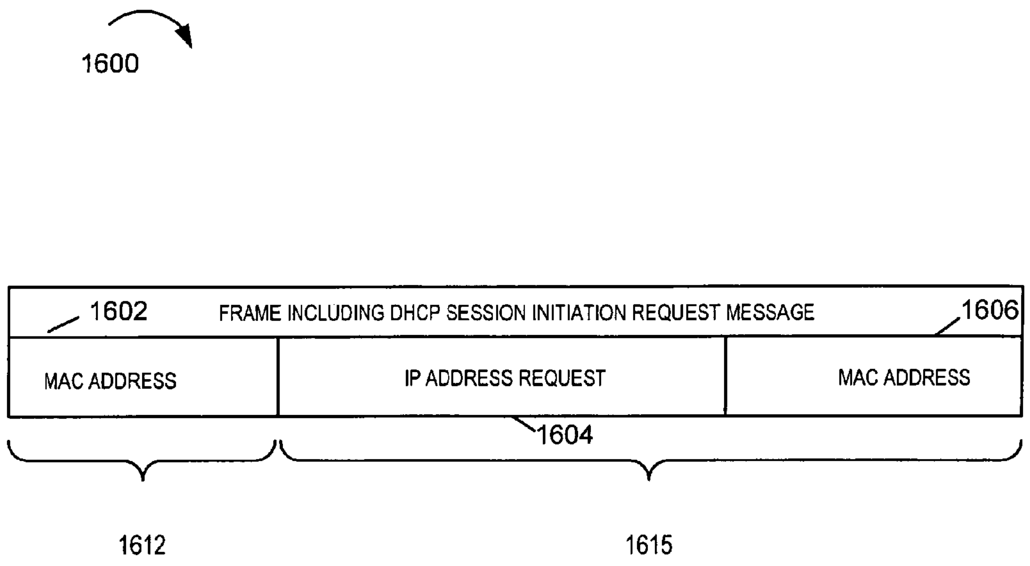
FIG. 16 illustrates a conventional frame that may be transmitted by a device on an Ethernet to request an IP address assignment.

FIG. 14 illustrates an exemplary frame/packet processing and forwarding routine 622 which implements DHCP session snooping along with various other security features of the present invention. Routine 622 may be used in an edge router, e.g., the edge router 600 such shown in FIG. 6.

The routine 622 starts in step 1401, e.g., with the edge router 600 being powered on. As part of start up, in step 1402 the edge router initializes its Layer 2 forwarding table 626 and Layer 2 to Layer 3 address resolution table 624. As part of the initialization process, the edge router may store an IP address corresponding to the DHCP server with which is to interact, e.g., as a proxy, for DHCP session purposes. The tables 626, 624 are populated over time in accordance with the present invention as will be discussed below.

Once initialization has been completed operation proceeds to step 1404 wherein the edge router 600 operates to receive frames and/or packets and to process the received frames and/or packets depending on their content, e.g., header and/or payload information. In accordance with the invention, the edge router snoops, e.g., monitors, communications to/from a DHCP server. Accordingly, when a received packet or frame is determined to correspond to a communication to/from a DHCP server, edge router processing proceeds to the DHCP communication snooping sub-routine via step 1406. An exemplary DHCP server subroutine 630 will now be described with reference to FIG. 15.

The DHCP snooping sub-routine starts in step 1501, e.g., in response to being called by routine 622. In step 1502, the detected communication to/from a DHCP sever is monitored and analyzed to determine the type of communication and which processing path should be followed. If the communication which triggered the sub-routine 1501 corresponds to a DHCP session initiation request message, as in the case of an Ethernet frame 1300 requesting an IP address assignment, operation will proceed from step 1502 to step 1504. In step 1504 the edge router compares the MAC address 1306 in the data portion of an IP address request message to the MAC address 1302 in the header portion of the request message. In step 1506, if, based on the comparison performed in step 1504, it is determined that the MAC address in the header does not match the MAC address in the data portion of the request message, indicating an attempted fraud or error, operation proceeds to step 1508 wherein edge router security routine 632 is invoked. The security routine 632, using the location identification techniques discussed above, determines the physical location of the perpetrator of the fraud based on the port address through which the IP address assignment was received, notifies authorities of the attempted fraud and/or takes other actions. Processing of the fraudulent IP address assignment request stops in step 1510, once the invoked security routine has completed the security actions to be taken. Thus, in the case where MAC address check is made in steps 1504 1506, the DHCP server will not be burdened with IP address assignment requests where the MAC address in the data portion of a message is inconsistent with MAC address in the header of the Ethernet frame which includes the IP address assignment request.

In the case where the MAC address in the header matches the MAC address in the body of a message, operation will proceed from step 1506 to step 1522.

In some embodiments, the security checks of step 1504 and 1506 are not implemented due to limited edge router processing resources. In such cases, mismatches in MAC addresses will go undetected at the edge router and processing will proceed from step 630 to step 1512 in the case of DHCP session initiation requests, even if a fraudulent MAC address is included in the data portion of a request message. However, as will be discussed below any IP address assigned based on a fraudulent MAC address will be of little use in the system of the present invention.

In step 1512, the edge router transmits a DHCP session initiation request to the DHCP server with the edge router acting as a proxy for the requesting device, e.g., a device on the Layer 2 network. Operation proceeds to proxy step 1514 wherein the edge router operates as a proxy for the duration of the DCHP session which it snoops to determine information used to update its LAYER2 to Layer 3 address resolution table.

In substep 1516 the edge router transmits at least a portion of a received frame, e.g., frame 1300, including an IP address assignment request and an indicated MAC address to the DHCP server 520. The edge router then proceeds to process the information received from the DHCP server 520. This processing proceeds along two parallel paths. In substep 1518, the edge router relays the IP address assigned by the DHCP server 520 in response to the assignment request along with lease time information and a corresponding address mask to the client device on the Layer 2 network which initiated the IP address assignment request. In parallel, the edge router a new Layer 2 to Layer 3 address table entry is generated. In step 1524 the MAC address portion of the new address table entry is populated using the MAC address obtained from snooping the DHCP session. If this address was faked and went undetected, the entry will thus include the faked MAC address. The IP address portion of the new entry is then populated in substep 1526 with the IP address assigned by the DHCP server 520 which was learned by snooping the DHCP session. IP address aging information and possibly other information learned by snooping the DHCP session is used in substep 1528 to populate aging and other fields of the new table entry thereby forming a complete Layer 2 to Layer 3 table entry which can be used for address resolution purposes, e.g., in the delivery of received IP packets over the Ethernet as part of an Ethernet frame. With the completion of substeps 1518 and 1528, e.g., at the end of a DHCP session corresponding to an IP address assignment operation, processing associated with the initiated DHCP session stops in step 1520. Thus, in accordance with the present invention, the L2 to L3 address resolution table is generated by snooping, e.g., monitoring, communications between devices on the Ethernet and the DHCP server 520 responsible for assigning IP addresses. ARP is NOT used when using this feature of the present invention. Note that since the MAC address entered in the L2 to L3 address resolution table was obtained from snooping the DHCP session, if it was faked, the MAC address will not match the MAC address loaded into the edge routers L2 forwarding table which was obtained from an Ethernet frame header. This will result in packets directed to the IP address assigned using the fake MAC address being dropped since the faked MAC address will not match any entries is the L2 forwarding table and packets corresponding to unmatched MAC addresses are dropped in accordance with the invention for security reasons.

In addition to monitoring for messages to initiate DHCP sessions for purposes of obtaining IP address assignments, the edge router will detect IP address release messages and DHCP client status queries all of which will result in the DHCP snooping sub-routine being called. In this manner, an accurate L2 to L3 address resolution table can be maintained and updated by snooping communications to/from the DHCP server 520.

If in step 1502 the detected communication is determined to be an IP address release message, e.g., transmitted to the DHCP server, operation will proceed to step 1532. In step 1532 the entry in the edge router's L2 to L3 address resolution table corresponding to the IP address message being released is deleted. If however, in step 1502, a DHCP client status query is detected, e.g., a message sent to determine if a client with a particular IP address is still active, operation proceeds from to step 1538. In step 1538 the edge router monitors for a response to the query message which would indicate that the client assigned the IP address specified in the status query was still active. If, in step 1540, it is determined that an expected response to the status query was not detected, operation proceeds to step 1542 and the entry corresponding to the IP address associated with the status query is removed from the L2 to L3 address resolution table. In this manner, IP addresses which are no longer being used by a device and are likely to be reassigned to another device due to a failure to respond to a status query from the DHCP server 520, will be removed in a timely fashion from the edge routers L2 to L3 address resolution table 624.

If in step 1540 it was determined that a response was received in a timely manner to a status query, processing performed in response to the query message will be stopped with the content of the L2 to L3 table 624 being left unchanged since the IP address associated with the status query remains in use.

In addition to updating the L2 to L3 address resolution table 624 based on information snooped from communications between and a device on the L2 network and the DHCP server, 520 entries will be removed when the lease time associated with an IP address expires. In this manner, entries for addresses whose lease times have expired will be removed from the table insuring accurate routing. As will be apparent from the remaining discussion of FIG. 14, when an address resolution table look-up operation results in a MAC addresses which is not found in the Layer 2 forwarding table 626, the corresponding IP packet is dropped by the edge router. As a result, devices which obtain IP addresses using fake MAC addresses are denied the receipt of packets directed to the IP address obtained using the fake MAC address.

Having discussed the DHCP snooping subroutine, we will now return to a discussion of the frame/packet processing and forwarding routine 622 shown in FIG. 14. If in step 1404, an IP packet for the L2 network is received, the L2 to L3 address resolution table 624 is consulted. If the L3 address is not found in the table 624, it is dropped the packet is dropped in step 1410. If the L3 address is found in the table, the IP packet is converted to a frame and the L2 address corresponding to the received L3 address is used. Then, in step 1415, the L2 forwarding table 626 is consulted to determine the port on which the generated Frame should be transmitted. If in step 1415, the L2, e.g., MAC, address for the generated frame cannot be found, the generated frame is dropped in step 1410. This will occur in the case of faked MAC addresses since the MAC address entered in the L2 to L3 address resolution table 624 will not match the MAC addresses entered in the L2 forwarding table 626 which were obtained from frame headers. Assuming that in step 1415 the L2 address is found in the L2 forwarding table 626, in step 1416 the generated frame is delivered via the port indicated in the L2 forwarding table 626. Processing by the edge router 600 in response to the received IP packet then stops in step 1412.

While the optional comparison of the MAC address in the body of a DHCP request to the header MAC address was described as being performed in some embodiments in the edge router 600, the same check can be performed in the DHCP server 520 prior to assignment of an IP address. In such embodiments, before assigning an IP address to a received MAC address, the DHCP server first contacts the edge router 600 from which the IP assignment request was made and inquires if the received MAC address is included in the edge routers L2 forwarding table 626. If the DHCP server 520 learns through this inquiry that the MAC address received in an IP address assignment request is not included in the edge routers L2 forwarding table 626, fraud is assumed and appropriate security measures are taken, e.g., the DHCP server 520 denies the request for an IP address assignment and signals the appropriate entities of a possible attempt to breach system security.

The above described method of snooping DHCP sessions has the advantage of providing a system with reliable MAC, router/port and location information which can be associated with an IP address being used. This information, which can be returned by the LCIS 534 in response to an information request, can be used to support a wide range of applications including location based service authorization/screening for IP based pay services such as VOD services, the detection of stolen devices and their location, and to confirm that a IP message is being received from a particular location. Such services may be provided by the security server 528 of the present invention.

Figure 17:
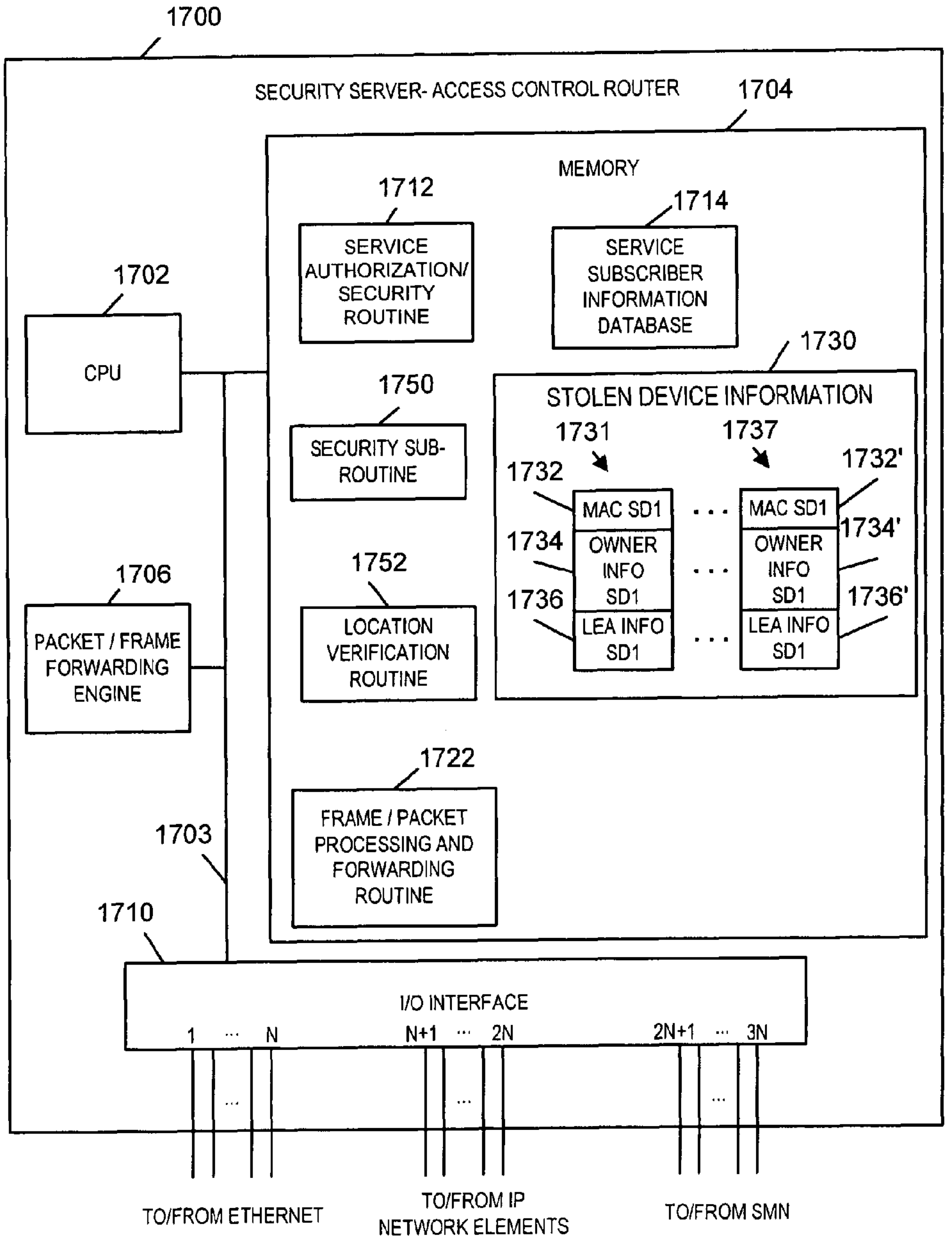
FIG. 17 illustrates an exemplary security server, implemented in accordance with the invention, which operates as an access control router.

FIG. 17 illustrates and exemplary security server 1700 which can be used in an IP network as a router that controls access to one or more other servers, e.g., a VOD server 571, MOD server 573 and/or banking server 575 and also has the ability to forward packets to other routers. The security server 1700 may be used as the security server 528 shown in FIG. 5.

The server 1700 includes a packet/frame forwarding engine 1706, an I/O interface 1710, memory 1704 and a CPU 1702 which are coupled together by a bus 1703. The packet/frame forwarding engine 1706 is used to process and forward packets according to routing information stored in memory 1704. I/O interface 1710 is used for coupling the server 1700 to other network devices including other IP network elements e.g., routers, optionally to an Ethernet, the SMN 532 including the LCIS 534 and additional networks, e.g., the PSTN 531, through soft switch 536, in some embodiments. The memory 1704 includes various routines including a service authorization/security routine 1712, security subroutine 1750, location verification routine 1752, frame/packet processing and forwarding routine 1722. The memory also includes a service/subscriber information database 1714 ad a stolen device information database 1730. The information in these databases 1714, 1730 may be used by the routines when they are executed by the CPU 1702. The various routines 1712, 1750, 1722, 1714 when executed by CPU 1702 control operation of the security server 1700 including packet/frame forwarding and other operations. While frame/packet processing and forwarding routine 1722 controls packet/frame routing and forwarding using routing and forwarding tables stored in memory 1704, such as those shown in FIG. 6, the service authorization/security routine 1712 operates to prevent forwarding of packets corresponding to a location which is not authorized to receive a service to which a packet is directed, e.g., as indicated by the packets destination address. An exemplary service authorization/security routine 1712 will be discussed in detail below.

Location verification routine 1752 is used to provide a location verification and reporting service. The service may be used to monitor individual's on parole, to monitor security guards as they make their rounds, etc. As will be discussed below, the location verification routine 1752 is used to process IP packets with an IP destination address corresponding to a location monitoring service and to verify that the received packet was sent from the expected physical location. In the event that the packet was sent from a location other than the expected location the routine 1752 provides a notification of the unexpected source location and indicates the location from which the packet actually originated. This facilitates retrieval and documenting of the location of individuals, e.g., parolees, as they periodically check in with the security server 1700 as part of their parole obligations.

In cases where device identification information, e.g., a MAC address, is returned to the service authorization/security routine 1712, the device identification information is compared to information in a database of stolen device information 1730. The database 1730 is periodically updated by device owners and/or law enforcement authorities (LEAs), e.g., the police. The stolen device information database 1730 includes a plurality of records 1731, 1737. Each record corresponds to one of a plurality of stolen devices SD1 through SDN. Each record 1731, 1737 includes device identification information, e.g., a MAC address 1732, 1732', owner information 1734, 1734' and law enforcement authority (LEA) information 1736, 1736'. Ownership information 1734 may include, e.g., the name, physical address (building address) and E-mail address of the owner of the stolen device. LEA information 1736 may include, e.g., the name of the law enforcement authority (LEA) which listed the item stolen or which should be contacted in the event the stolen device is detected or located, the physical address of the LEA to be contacted and the LEA's E-mail address. The owner and/or LEA E-mail address information is used, in various embodiments, to send E-mail or another notification, e.g., an instant message notification to the owner and/or LEA corresponding to a stolen device when the device is detected. The notification information will normally include information, including the physical location of the stolen device as determined from the LCIS 534 as well as information on the time actual or attempted use of the stolen device was detected.

FIG. 18 illustrates an exemplary service subscriber information database 1714 which may be used by the security server 1700. The service subscriber information database includes a plurality of rows, 1820, 1822, 1824, 1825, each row represents a separate information record corresponding to a different service subscriber or individual. Each row is divided into a plurality of columns which store various type of information.

The first column 1802 stores the name of the party or individual to which the record corresponds. In the case of a subscription service, the name in column 1802 will normally correspond to a service subscriber. In the case of a location monitoring service, the name in column 1802 will normally correspond to the name of the individual, e.g., parolee, who's location is being check based on received messages, e.g., IP packets. The second column 1804 includes physical location information, e.g., the location of the subscriber or the listed residence of the person who's location is being monitored. The third column 1806 includes service information. This normally includes an identifier (e.g., VOD, MOD, LOC VER) of the service or services to be provided to the service subscriber or individual to which the record corresponds. Exemplary services include Video on Demand (VOD), music on demand (MOD) and location verification (LOC VER). The service information 1806 normally also includes an IP address for each one of the services to be supported. This IP address will normally correspond to the address of the service provider's server or, in the case of a location verification service, an IP address to which the monitored individual is to send messages at pre-selected times. Rows 1820, 1822 and 1824 correspond to different VOD service subscribers. Row 1822 corresponds to a subscriber who subscribes to a MOD service in addition to a VOD service. ROW 1823 corresponds to a subscriber who uses an at home banking service. Row 1825 corresponds to an individual who is subject to location monitoring as indicated by the LOC VER indicator in the service information column 1806. Location verification service information may include, information on the location from which the monitored individual is to initiate contact and the times the security server is to be contacted to enable location monitoring. The information 1806 may, and often does in the case of a location verification service, also include information on the format of a location verification report to be generated and an E-mail or other address where the monitoring report or alerts regarding location discrepancies or failures to receive messages at anticipated times are to be sent.

A match between a IP packet destination address and an IP address corresponding to a particular service listed in column 1806 is normally interpreted as an attempt to obtain the service to which the IP packet destination address corresponds.

The fourth through eighth columns 1808, 1810, 1812, 1814 include information which is returned by the LCIS 534 in response to an information request concerning an IPAOI which is normally the source address of a received IP packet. Column 1808 includes router and port information which identifies the port of the edge router from which the packet including the IPAOI was received. Column 1810 includes the MAC address of the device associated with the IP address listed in column 1812. Column 1812 lists the IP address for which information was returned from the LCIS 534, e.g., the IPAOI, while column 1814 includes IP address lease time information for the IP address of the same row. The information in columns 1808, 1810, 1812, 1814 will be deleted when the IP address lease time information in column 1814 indicates that the lease for the IP address stored in column 1812 has expired. In this manner, the information in the information database 1714 is kept timely. In some embodiments, the DHCP server 520 sends information to the security server 528 when an IP address lease expires prematurely, e.g., due to a failure of a device using an IP address to respond to a status inquiry from the DHCP server 520. This allows the information database 1714 to be updated to reflect that the IP address is no longer associated with the particular device identified by the MAC in column 1810 in an extremely timely manner. This updating normally involves deleting the information in columns 1808-1814 corresponding to the IP address whose lease expired prematurely.

An exemplary service authorization/security routine 1712 shown in FIG. 19 will now be described. The routine starts in step 1902 when it is executed, e.g., when the security server 528 is powered up. Next, in step 1906 the routine 1712 monitors for received packets 1904 having a packet destination address corresponding to a service which is to be provided. This may be done by comparing the destination address of a received packet to IP service addresses listed in service information column 1806 to determine if there is a match. For each packet having a destination address matching that of a service to be provided, operation proceeds to step 1911. In step 1911, a check is made to determine if the packet destination address corresponds to a location verification service. If it does, operation proceeds to step 1913 which causes processing to GOTO location verification routine step 2104 so that the service can be provided. The received IP packet corresponding to the location verification service, e.g., a packet corresponding to a message used to report the location of an individual who's location is being monitored is also passed to the location verification routine 1752 as part of GOTO step 1913. An exemplary location verification routine 1752 will be discussed below with regard to FIG. 21.

If in step 1911, it is determined that the destination address of the received IP packet does not correspond to a location verification service, operation proceeds to step 1908. In step 1908, a determination is made as to whether or not the packet source IP address is already listed in the subscriber service information database, e.g., in the sixth column 1812, indicating that a location check was already performed on the IP address and that the lease time of the IP address has not expired.

If in step 1908 it is determined that the packets source IP address is not in the subscriber service information database 1714, operation proceeds to step 1916 wherein an information request message including the packet's source IP address is sent to the LCIS 534 in order to obtain location and other information, e.g., a MAC address and IP address lease time information, from the LCIS 534. Next, in step 1918, the location and/or additional information is received from the LCIS 534 in response to the information request message sent in step 1916. Then, in step 1920, assuming a MAC address was returned with the location information received in step 1918, a check is made to determine if the returned MAC address or another device identifier returned by the LCIS 534 corresponds to a stolen device MAC address or other stole device identifier listed in the database of stolen device information 1730.

Figure 20:
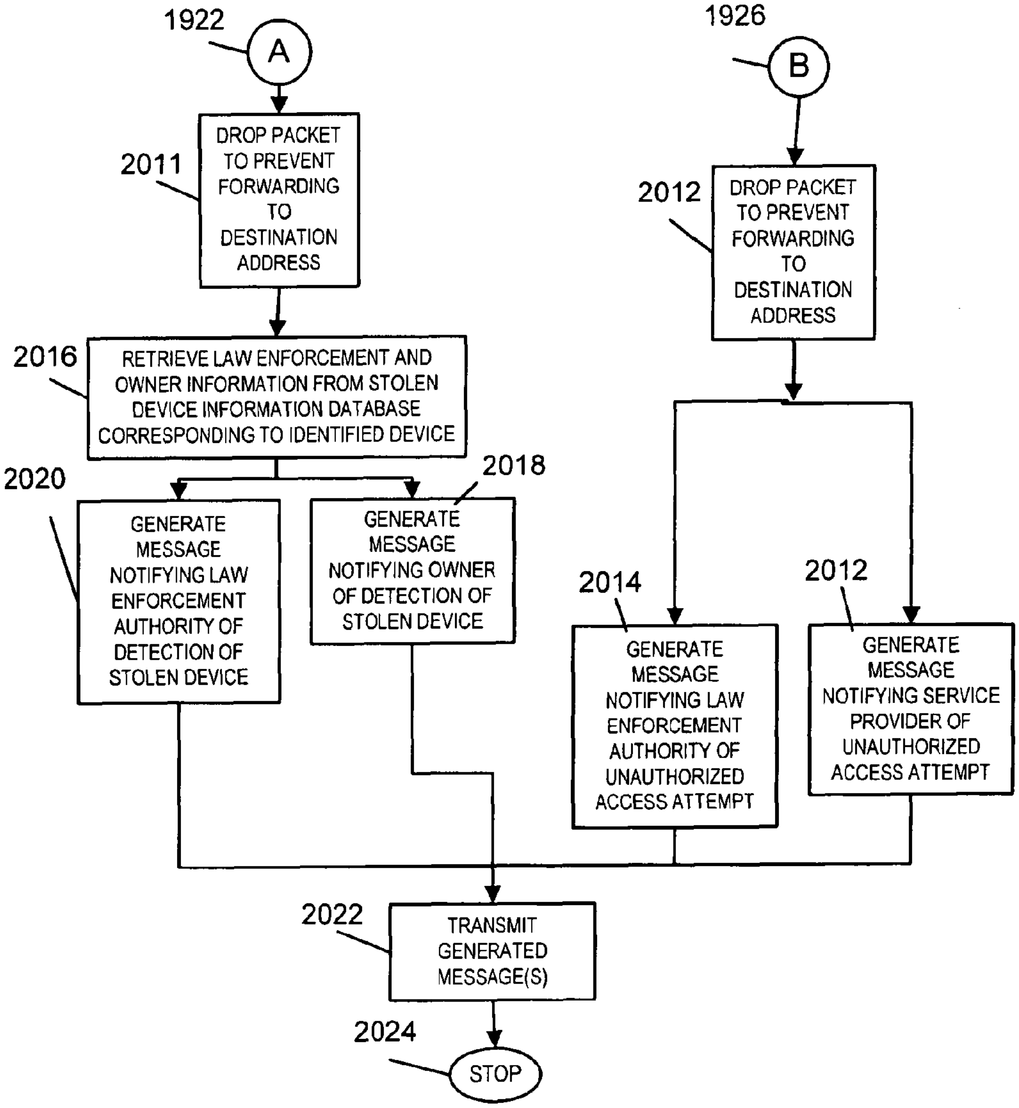

If the MAC address or other identifier corresponds to a stolen device entry, operation proceeds to step 2011 of FIG. 20 via connecting node 1922. In step 2011, the packet corresponding to the stolen device is dropped to prevent forwarding to the IP packet's destination address. Then, in step 2016 law enforcement and owner information corresponding to the stolen device is retrieved from the stolen device information database. The retrieved law enforcement and ownership information is used in steps 2020, 2018, respectively, to generate law enforcement and owner notification messages. These messages may include, e.g., along with information obtained from the IP packet, location and other information received from the LCIS 534. The generated messages are transmitted in step 2022. Thanks to the inclusion of location information, the party, e.g., owner or law enforcement authority, receiving the message may be informed not only that someone is attempting to use the stolen device at a particular time but also the actual physical location of the stolen device making retrieval possible. After transmission of the stolen device notification messages processing corresponding to the particular IP packet received from the stolen device stops in step 2024.

Referring once again to FIG. 19, if in step 1920, the MAC address or other device identifier returned by the LCIS 534 was determined not to correspond to a stolen device, operation proceeds to step 1928 wherein a determination is made as to whether the returned information corresponds to one of the customer records included in subscriber service information database 1714. This determination may be made by comparing, e.g., name, physical location and/or router and port information to the stored information included in the subscriber service information database 1714 to identify a match between the retuned information and the information in an existing customer record. If in step 1928, no corresponding subscriber record is found, the received IP packet is considered to correspond to a hacking attempt, e.g., an attempt to get access to a service without being a subscriber, and operation proceeds via connecting node 1926 to step 2012 of FIG. 20.

In step 2012 the IP packet which has been determined to correspond to a hacking attempt is dropped without being forwarded to the service provider to which it was directed thereby preventing the service provider, e.g., banking server 575, VOD server 571, or MOD server 572, from having to respond. Then in steps 2014 and 2012 messages notifying law enforcement and the service provider of the unauthorized access attempt are generated. The messages are transmitted in step 2022 allowing the appropriate authorities to take action. The generated messages include location and/or other information obtained from the LCIS 534 in addition to IP address and other information from the dropped packet making tracking of the hacking attempt to a particular physical location and/or device possible. Processing relating to the IP packet corresponding to a hacking attempt stops in step 2024.

Figure 19:
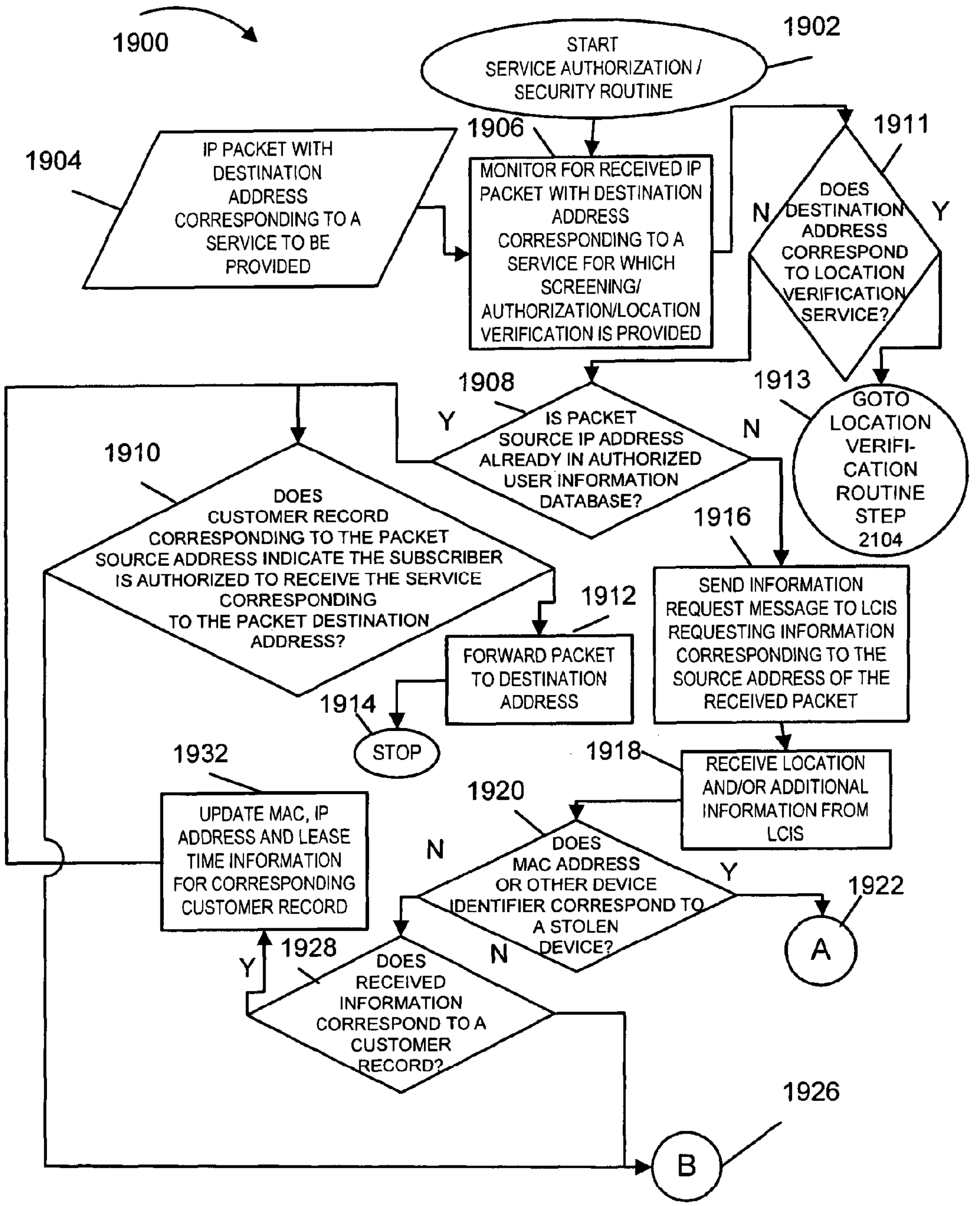
FIGS. 19 and 20 illustrate the steps of an exemplary service authorization/security routine which may be implemented by the security server of FIG. 17.

Referring once again to step 1928 of FIG. 19, assuming the information received from the LCIS 534 is determined to correspond to a subscriber record included in the information database 1714, operation proceeds to step 1932 wherein the MAC, IP address and IP address lease time information included in the corresponding customer record is updated to reflect this information which was obtained from the LCIS 534. Once the customer record is updated operation proceeds to step 1910. Operation would have proceeded directly from step 1908 to 1910 if the source IP address in the packet was determined in step 1908 to already be in the authorized user information database 1714.

In step 1910 a determination is made as to whether the customer record corresponding to the IP packet's source address, e.g., the record having the IP source address in column 1812, indicates the subscriber is authorized to receive the service corresponding to the packet destination address. This check can be done by determining the services to which the corresponding record indicates the subscriber is entitled to receive, e.g., by comparing the packet destination address to the IP addresses of the IP servers which provide the various services to which the user subscribes. The IP server addresses may be obtained from the service information included in column 1804 of the subscriber service information database 1714.

Assuming the IP packet destination address corresponds to a service for which the source location is authorized, operation will proceed from step 1910 to step 1912 wherein the packet is forwarded to the destination address included therein. If in step 1910 it is determined that the location, e.g., customer premises, corresponding to the source of the IP packet directed to a service provider was not authorized to receive the service to which the packet is directed, operation proceeds from step 1910 to step 2012 via step 1926. In step 2012 the packet is dropped thereby avoiding burdening an IP based service provider, e.g., VOD service provider, with unauthorized requests.

In the above described manner, an authorized location is able to send IP packets to the VOD server 571, MOD server 573 or a banking server 575 with the security server 528 operating as a firewall device which uses the packet source location as the factor used to determine whether packets are passed or dropped. Thus, the methods of the present invention can be used as a location based firewall to restrict access to particular services to particular physical locations, e.g., licensed customer premises and/or business sites.

Figure 21:
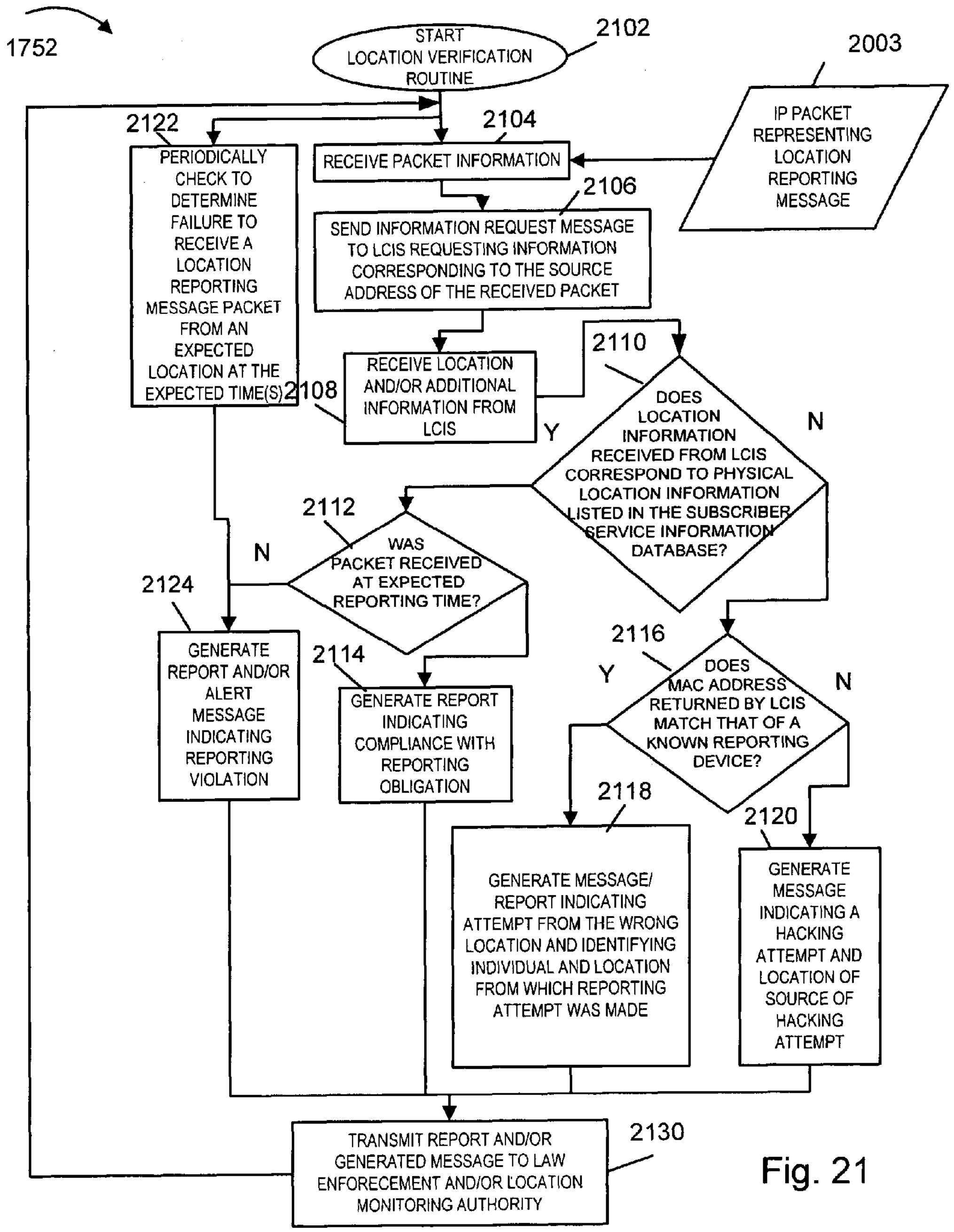
FIG. 21 illustrates the steps of a location verification routine which may be implemented by the server of FIG. 17 in accordance with the invention.

The location verification routine 1752 shown in FIG. 21 will now be described in detail. This service may be used for monitoring the location of paroles. The paroles may be provided with bracelets or other devices, e.g., wireless devices, with known preprogrammed MAC addresses which can be used to contact a monitoring service, e.g., security server 528, at pre-selected points in time. In various embodiments the bracelet provided to a monitored individual transmits a location verification message to the security server. This may be done using a leased IP address with the methods of the present invention being used to confirm, in a reliable manner, the actual physical location from which an IP location verification message is transmitted. The security server 528 uses a specific IP address to receive packets intended for the location verification server. This address may be a dedicated IP address which is preprogrammed into the bracelets as the destination address for location verification messages. Location verification messages sent to the security server 528 may include the name of the parolee, transmission time information and/or other information.

The location verification routine 1752, as discussed above, can be used to verify that IP packets corresponding to a reporting message, e.g., a location reporting message, are received from an expected location and/or at an expected, e.g., pre-selected, time. It can also be used to report failures by an individual whose location is to be monitored, to contact the security server from the predetermined location at the predetermined time, e.g., a time interval between during which the monitored individual is to be at the predetermined location.

The location verification routine starts in step 2102 when it is first executed by the security server 528. From step 2102 operation proceeds to steps 2122 and step 2104 which may occur in parallel. Step 2122 involves a periodic check to detect any failure to receive a location reporting message packet from an expected location at an expected time. This involves comparing stored reporting information locations and times included in column 1806 of the service information database 1714, e.g., indicating times and locations from which location reporting messages are to be received, to information indicating the receipt of a packet corresponding to a reporting message from a particular location and the time of packet's receipt or transmission. Such information may be obtained from report information included in reports generated in step 2114 which are discussed below. In the event a failure to report receive a reporting message from a location at an expected time is detected in step 2122, operation proceeds to step 2124 wherein a report and/or alert message indicating a reporting violation is generated. Absent detecting a failure to report, operation will not proceed from step 2122 to step 2124 and a check will again be made in step 2122 at the next time scheduled to check for reporting failures.

Step 2104 involves the receipt of packet information 2003 which is passed to the location verification routine 1752, e.g., from the service authorization/security routine in step 1913. Operation proceeds from step 2104 to step 2106. In step 2106, the location verification routine 2102 generates an information request message which is sent to the LCIS 534. The information request message includes the source address of the packet received in step 2104 as an IPAOI and seeks location and related information, e.g., MAC address corresponding to the IPAOI. Next, in step 2108, the security server receives location and/or additional information corresponding to the IPAOI. Location information may be provided in the form of an actual physical location and/or in terms of a port of a router with which a particular physical location is associated. Additional information returned by the LCIS 534 may include, e.g., MAC address information obtained from the edge router and/or a DHCP server which leased the IPAOI, and the name of the party, e.g., individual to be monitored or service subscriber, corresponding to the physical location from which the IP address was sent.

Following receipt of the information from the LCIS 534, in step 2110 a determination is made as to whether or not the location and/or name information received from the LCIS 534 corresponds to, e.g., match, physical location and/or name information listed in a record in the subscriber service information database 1714. If corresponding record is identified in step 2110, indicating the packet corresponds to an individual who is supposed to report in at pre-selected times, operation proceeds to step 2112 to determine if the packet was sent at an expected reporting time. This may be done by comparing expected reporting time information stored in the corresponding information record to a time, e.g., transmission or receipt time, associated with the IPPOI to determine if there is a match indicating that the packet was sent at an expected time.

If in step 2112 it is determined that the packet corresponding to the location reporting message was sent at an expected time, operation proceeds to step 2114 wherein a report indicating compliance with a location reporting obligation is generated. The generated report will normally indicate the name of the reporting individual, the location from which the individual reported, and the time at least one packet of a location reporting message was sent and/or received. After generation of the report, operation proceeds to step 2130 wherein the generated report is transmitted to the monitoring and/or law enforcement authority associated with the monitored individual to which the report corresponds.

If in step 2112 is it was determined that the packet was not received at the expected time, indicating a failure to report in a timely manner, operation proceeds to step 2124 wherein a report and/or alert message indicating a reporting violation is generated. This report/message includes similar information to that included in the report generated in step 2114 but indicates that a violation of a location reporting deadline has been detected. An alert message, e.g., an instant message, may be generated as part of step 2124 so that law enforcement and/or the monitoring authority can be notified in a timely manner and take steps to locate/recapture the non-reporting individual if necessary. Operation proceeds from step 2124 to step 2130 wherein the generated message and/or report are transmitted to the appropriate authorities.

If in step 2110 it is determined that the location information returned from the LCIS 534 does not match a record listed in the subscriber information database, operation proceeds to step 2116. In step 2116 an attempt is made to determine from the MAC address the device which was used to transmit the IP packet which corresponds to a location reporting message. In the case where a monitoring device, e.g., wrist band, is assigned to a parole, the MAC address of reporting devices may be known before hand, stored in the subscriber information database. This information is used to identify a device which is reporting from a location which is different from an expected reporting location. In some cases, the IP location reporting message itself includes device identifier information and information identifying the individual being monitored which can be used for reporting purposes making MAC address based identification on a reporting individual unnecessary.

If, in step 2116, it is determined that the MAC address returned by the LCIS 534 does not match that of a known location reporting device listed in the service information database 1714, operation proceeds to step 2120 wherein a message indicating a hacking attempt is generated. Information on the location corresponding to the source of the hacking attempt, obtained from the LCIS 534, is included in the message along with other information, e.g., the MAC address associated with the IP address which was the source of the message considered a hacking attempt. Following generation of the message, operation proceeds to step 2130 wherein the message is transmitted to the appropriate authority.

If in step 2116 is was determined that the MAC address returned by the LCIS 534 matched the MAC address of a known reporting device, e.g., a MAC address listed in a record of the database 1714, operation proceeds to step 2118. In some embodiments, where the received location reporting message includes information identifying the reporting individual or reporting device, operation proceeds from step 2110 to step 2118 without the need to obtain and check a MAC address as done in step 2116.

In step 218 a message and/or report is generated indicating that a location reporting message was from the wrong location and identifying the individual corresponding to the false location reporting message as well as the actual location from which the message was sent. The individual may be determined from information included in the location reporting message to which the received packet corresponds and/or from correlating a returned MAC address to a record in the information database 1714. Other information obtained from the LCIS 534 along with time information may be included in the message/report as well. Since the LCIS 534 returns information on the location of the source of the message, it is easy for law enforcement or other authorities to locate and apprehend the individual transmitting the false location reporting message.

Operation proceeds from step 2118 to step 2130 wherein the generated report and/or message are transmitted. The location verification routine 1752 continues to operate on an ongoing basis with operation proceeding from step 2130 to step 1222 and step 2104 which may led to the generation and transmission of additional reports/messages.

Various additional embodiments will be apparent to those skilled in the art in view of the above description. For example, rather than return location and/or other customer information, in cases where only reliable device identification information is required, the LCIS 534 could return, e.g., the MAC address corresponding to an IPAOI, without the other customer information. Such an embodiment would be useful e.g., in cases where services were to be limited to specific physical devices.

The routines used to control the edge router and other devices used in the communications system of the present invention may be implemented as machine-readable instructions stored on a machine-readable medium such as memory, hard disk, or other type of memory device. Various aspects of the present invention are directed to such machine-readable medium.

Numerous variations on the above described methods and apparatus are possible without departing from the scope of the invention.

What is claimed is:

1. A communication system comprising:

an edge router including:

a frame processing module configured to generate, in a forwarding table, a MAC address forwarding table entry from a MAC address included in a header of a frame received by said edge router;

a snooping module configured to monitor a communications session between a device on a network which uses MAC addresses with a server responsible for assigning IP addresses to detect assignment of an IP address corresponding to a MAC address provided in a data portion of a message from said device; and an address resolution table management module configured to create an entry in an address resolution table associating an assigned IP address with said MAC address provided in the data portion of said message upon detecting assignment of an IP address corresponding to a MAC address provided in a data portion of said message.

2. The communication system of claim 1, wherein support for Address Resolution Protocol is disabled in said edge router.

3. The communication system of claim 2, wherein said edge router further includes:

a security module configured to discard IP packets corresponding to IP addresses for which a MAC address included in said address resolution table does not have a corresponding MAC address entry in said MAC address forwarding table.

4. The communications system of claim 3, wherein said edge router further comprises:

an address resolution table including IP address aging information obtained from monitoring information associated with said IP address assignment.

5. The communications system of claim 4, wherein said edge router snooping module is further configured to:

monitor for IP address release messages transmitted from said network to the server responsible for assigning IP addresses; and wherein said address resolution table management module is further configured to delete, in response to detecting an IP address release message, an entry in said address forwarding table corresponding to an IP addresses included in said detected IP address release message.

6. The communications system of claim 5, wherein said edge router snooping module is further configured to compare a MAC address included in the data portion of an IP address assignment request message to a MAC address included in the header of said IP address assignment request message.

7. A communication system comprising:

an edge router wherein support for Address Resolution Protocol is disabled in said edge router, said edge router including:

a frame processing module configured to generate, in a forwarding table, a MAC address forwarding table entry from a MAC address included in a header of a frame received by said edge router;

a snooping module configured to monitor a communications session between a device on a network which uses MAC addresses with a server responsible for assigning IP addresses to detect assignment of an IP address corresponding to a MAC address provided in a data portion of a message from said device;

an address resolution table management module configured to create an entry in an address resolution table associating an assigned IP address with said MAC address provided in the data portion of said message upon detecting assignment of an IP address corresponding to a MAC address provided in a data portion of said message;

a security module configured to discard IP packets corresponding to IP addresses for which a MAC address included in said address resolution table does not have a corresponding MAC address entry in said MAC address forwarding table;

an address resolution table including IP address aging information obtained from monitoring information associated with said IP address assignment;

the snooping module further configured to monitor for IP address release messages transmitted from said network to the server responsible for assigning IP addresses;

the address resolution table management module further configured to delete, in response to detecting an IP address release message, an entry in said address forwarding table corresponding to an IP addresses included in said detected IP address release message;

the snooping module further configured to compare a MAC address included in the data portion of an IP address assignment request message to a MAC address included in the header of said IP address assignment request message; and the security module further configured to generate a security alert signal in response to detecting a mismatch between the MAC address included in the data portion of said IP address assignment request message and said MAC address included in the header of said IP address assignment request message.

8. The communications system of claim 7, further comprising:

an information module configured to transmit MAC address information obtained by accessing a forwarding table included in said edge router to said server in response to a request for MAC address information corresponding to an IP address assignment request.

9. The communications system of claim 8, wherein said MAC address information indicates whether or not a MAC address included in said IP address assignment request is present in a layer 2 forwarding table included in said edge router.

* * * * *